(12) United States Patent
Tonegawa et al.

(10) Patent No.: US 6,963,655 B1
(45) Date of Patent: Nov. 8, 2005

(54) ALTERATION DETECTION APPARATUS AND METHOD THEREOF

(75) Inventors: Satoko Tonegawa, Yamato (JP); Norishige Morimoto, Tokyo-to (JP); Kohichi Kamijoh, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,377

(22) Filed: Apr. 12, 2000

(30) Foreign Application Priority Data

Apr. 14, 1999 (JP) .............................. 11-107055
Jun. 4, 1999 (JP) .............................. 11-158358

(51) Int. Cl.$^7$ .............................................. G06K 9/00
(52) U.S. Cl. .................................................... 382/100
(58) Field of Search ........................ 382/100; 713/176; 283/72

(56) References Cited

U.S. PATENT DOCUMENTS

| | | | |
|---|---|---|---|
| 5,652,626 A * | 7/1997 | Kawakami et al. ......... 348/463 |
| 6,005,936 A * | 12/1999 | Shimizu et al. ............. 713/176 |
| 6,037,984 A * | 3/2000 | Isnardi et al. .......... 375/240.21 |
| 6,064,764 A * | 5/2000 | Bhaskaran et al. ......... 382/183 |
| 6,275,599 B1 * | 8/2001 | Adler et al. ................ 382/100 |
| 6,304,966 B1 * | 10/2001 | Shimizu ..................... 713/100 |
| 6,373,974 B2 * | 4/2002 | Zeng .......................... 382/135 |
| 6,504,941 B2 * | 1/2003 | Wong ......................... 382/100 |

FOREIGN PATENT DOCUMENTS

| | | |
|---|---|---|
| JP | 10-83310 | 3/1998 |
| JP | 10-106149 | 4/1998 |
| JP | 10-161933 | 6/1998 |
| JP | 10-164549 | 6/1998 |
| JP | 10-240626 | 9/1998 |
| JP | 10-285562 | 10/1998 |
| JP | 10-334272 | 12/1998 |
| WO | WO97/49235 | 12/1997 |

* cited by examiner

*Primary Examiner*—Vikkram Bali
(74) *Attorney, Agent, or Firm*—Scully, Scott, Murphy & Presser; Louis P. Herzberg

(57) ABSTRACT

The present invention is directed to the detection of what part of an image alteration was added to by embedding an electronic watermark in the image. More particularly, embedding part 30 renders as pairs two each of DCT blocks of luminance component Y of an image, randomly selects, by using a random number, mutually corresponding DCT coefficients from each DCT block contained in the pairs, and manipulates so that the relationship among these DCT coefficients represent data according to a certain rule, and then embeds the data. If alteration is added to this image, the DCT coefficients contained in the pairs in the altered part do not observe the above rule and represent different values from the original data. Extraction part 40 extracts data from the image, and makes decision by majority to estimate the initially embedded data to detect and display the pairs from which different data form the estimated data was extracted as those to which alteration was added.

15 Claims, 24 Drawing Sheets

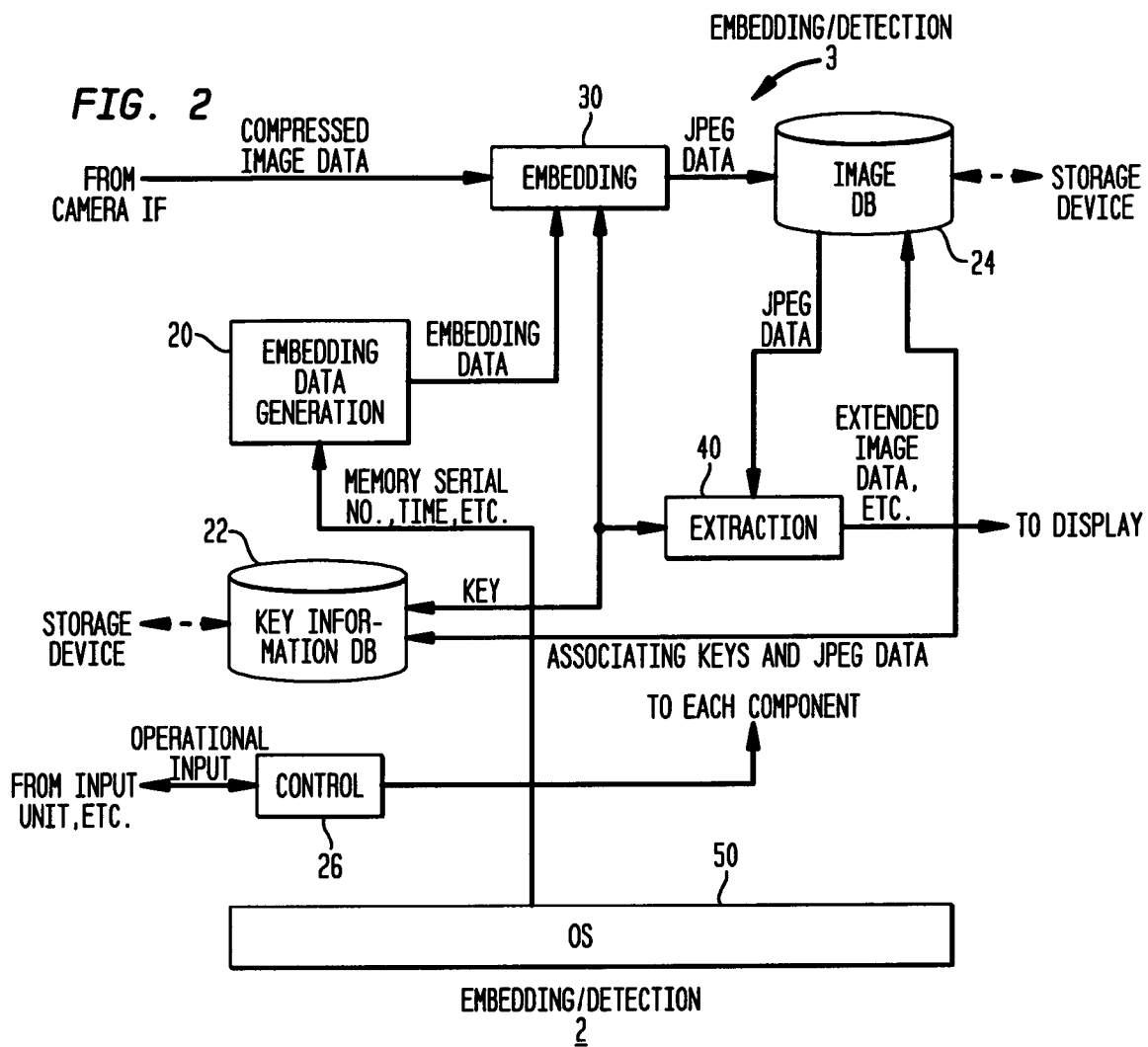
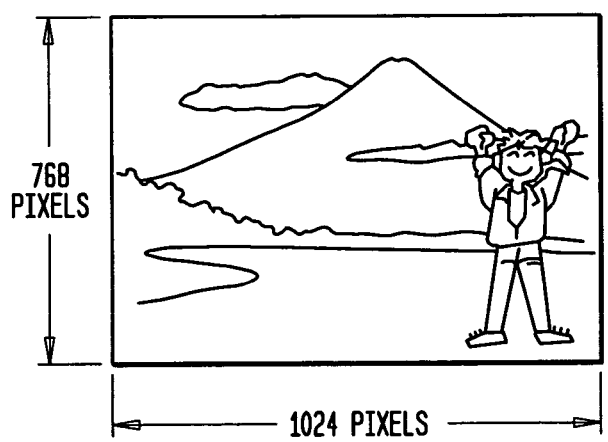

BLOCK 1      BLOCK 2

| DCT BLOCK PAIR NO. | BLOCK 1 COEFFICIENT | | | BLOCK 2 COEFFICIENT | | | EMBEDDING DATA'S BIT NO. | EMBEDDING DATA ALLOCATION |
|---|---|---|---|---|---|---|---|---|
| | A1 | B1 | C1 | A2 | B2 | C2 | (1~96) | |
| 1 | 1 | 5 | 2 | 5 | 6 | 3 | 31 | 1 |
| 2 | 5 | 8 | 9 | 2 | 5 | 5 | 21 | 0 |
| 3 | 2 | 10 | 9 | 5 | 1 | 2 | 18 | 1 |
| 4 | 1 | 11 | 5 | 5 | 3 | 20 | 65 | 0 |
| 5 | 10 | 2 | 25 | 1 | 3 | 24 | 7 | 1 |
| ⋮ | ⋮ | ⋮ | ⋮ | ⋮ | ⋮ | ⋮ | ⋮ | ⋮ |
| 160 | 5 | 30 | 11 | 6 | 9 | 10 | 7 | 1 |
| ⋮ | ⋮ | ⋮ | ⋮ | ⋮ | ⋮ | ⋮ | ⋮ | ⋮ |
| 6144 | 51 | 20 | 11 | 3 | 19 | 15 | 34 | 1 |

FIG. 22

| | 1 | 2 | 3 | 4 | 5 | | 96 |
|---|---|---|---|---|---|---|---|
| PAIRS 1-96 | PAIR11 1 | PAIR5 0 | PAIR31 1 | PAIR9 1 | 0 | . . . . | 1 |
| PAIRS 97-192 | PAIR99 1 | PAIR126 0 | PAIR150 1 | PAIR153 1 | 0 | . . . . | 1 |
| PAIRS 193-288 | 1 | 0 | 1 | 1 | 0 | . . . . | 1 |
| PAIRS 289-384 | 1 | 0 | 1 | 1 | 0 | . . . . | 1 |
| . . . | . | . | . | . | . | | . |
| PAIRS 6049-6144 | 1 | 0 | 1 | 0 | 0 | . . . . | 1 |
| EXTRACTION RESULT | 1 | 0 | 1 | 1 | 0 | . . . . | 1 |

} REPEAT 64 TIMES

| DETECTED EMBEDDING DATA'S BIT NUMBER | 1 | 2 | 3 | 4 | 5 | | 96 |
|---|---|---|---|---|---|---|---|
| PAIRS 1-96 | BLOCK 11 1 A | BLOCK 5 0 B | BLOCK 31 1 A | BLOCK 9 1 A | 0 B | ... | 1 A |
| PAIRS 97-192 | BLOCK 99 1 A | BLOCK 126 0 B | BLOCK 150 1 A | BLOCK 153 1 A | 0 B | ... | BLOCK 185 0 B |
| PAIRS 193-288 | 1 A | 0 B | 1 A | BLOCK 255 0 B | 0 B | ... | BLOCK 254 0 B |
| PAIRS 289-384 | 1 A | BLOCK 315 1 A | 1 A | C | BLOCK 316 1 A | ... | 1 A |
| PAIRS 385-480 | BLOCK 399 0 B | BLOCK 400 C | 1 A | 1 A | 0 B | ... | 1 A |
| PAIRS 481-576 | 1 A | 0 B | 1 A | 1 A | BLOCK 520 1 A | ... | 1 A |
| ⋮ | ⋮ | ⋮ | ⋮ | ⋮ | ⋮ | | ⋮ |
| EXTRACTION RESULT | 1 | 0 | 1 | 1 | 0 | ... | 1 |

☐ MISMATCH

2 X 2 PIXEL BLOCK

FIG. 34

| 2 X 2 PIXEL BLOCK NO. | 2 X 2 PIXEL BLOCK'S PIXEL VALUE | | | | EMBEDDING DATA'S BIT NO. | EMBEDDING DATA ALLOCATION |
|---|---|---|---|---|---|---|
| | A | B | C | D | (1~96) | |
| 1 | 1 | 5 | 2 | 5 | 31 | 1 |
| 2 | 5 | 8 | 9 | 2 | 21 | 0 |
| 3 | 2 | 10 | 9 | 5 | 18 | 1 |
| 4 | 1 | 11 | 5 | 5 | 65 | 0 |
| 5 | 10 | 2 | 25 | 1 | 7 | 1 |
| ⋮ | ⋮ | ⋮ | ⋮ | ⋮ | ⋮ | ⋮ |
| 160 | 5 | 30 | 11 | 6 | 7 | 1 |
| ⋮ | ⋮ | ⋮ | ⋮ | ⋮ | ⋮ | ⋮ |
| 12288 | 51 | 20 | 11 | 3 | 34 | 1 |

FIG. 35A

|   | 1 | 2 |
|---|---|---|
| 1 | 13 A | 52 B |
| 2 | C 164 | D 0 |

FIG. 35B

|   | 1 | 2 |
|---|---|---|
| 1 | (12) A | 52 B |
| 2 | C 164 | D 0 |

FIG. 36

|   | 1 | 2 |
|---|---|---|
| 1 | 166 A | 252 B |
| 2 | C 58 | D 2 |

FIG. 37A

|   | 1 | 2 |
|---|---|---|
| 1 | 21  A | B  101 |
| 2 | C  253 | D  0 |

FIG. 37B

|   | 1 | 2 |
|---|---|---|
| 1 | 21  A | B  101 |
| 2 | C  253 | D  (1) |

FIG. 38

|   | 1 | 2 |
|---|---|---|
| 1 | 11  A | B  57 |
| 2 | C  89 | D  121 |

FIG. 39

| DETECTED EMBEDDING DATA'S BIT NUMBER | 1 | 2 | 3 | 4 | 5 | | 96 |
|---|---|---|---|---|---|---|---|
| PAIRS 1-96 | BLOCK 11 <br> 1 A | BLOCK 5 <br> 0 B | BLOCK 31 <br> 1 A | BLOCK 9 <br> 1 A | 0 B | · · · | 1 A |
| PAIRS 97-192 | BLOCK 99 <br> 1 A | BLOCK 126 <br> 0 B | BLOCK 150 <br> 1 A | BLOCK 153 <br> 1 A | 0 B | · · · | BLOCK 185 <br> 0 B |
| PAIRS 193-288 | 1 A | 0 B | 1 A | BLOCK 255 <br> 0 B | 0 B | · · · | BLOCK 254 <br> 0 B |
| PAIRS 289-384 | 1 A | BLOCK 315 <br> 1 A | 1 A | C | BLOCK 316 <br> 1 A | · · · | 1 A |
| PAIRS 385-480 | BLOCK 399 <br> 0 B | BLOCK 400 <br> C | 1 A | 1 A | 0 B | · · · | 1 A |
| PAIRS 481-576 | 1 A | 0 B | 1 A | 1 A | BLOCK 520 <br> 1 A | · · · | 1 A |
| ⋮ | ⋮ | ⋮ | ⋮ | ⋮ | ⋮ | | ⋮ |
| EXTRACTION RESULT | 1 | 0 | 1 | 1 | 0 | · · · | 1 |

REPEAT 128 TIMES

☐ MISMATCH

ALTERATION DETECTION APPARATUS AND METHOD THEREOF

BACKGROUND OF THE INVENTION

1. Technical Field

The present invention relates to a contents alteration detection apparatus and a method thereof for embedding authentication data including copyright information imperceptibly in contents data such as image data and detecting which part of the contents alteration was added to by using the embedded authentication data.

2. Prior Art

For instance, International Publication No. WO97/49235 discloses a method for embedding copyright information and so on (hereafter, also generally referred to as authentication information) in contents data such as image data by pixel block coding (PBC) in a visually imperceptible manner (hereafter, the manner of imperceptibly embedding an authentication method in contents data is also referred to as the "electronic watermarking method").

In addition, International Publication No. WO98/116928 discloses a method for prohibiting alteration of image data to effectively protect publications by applying the electronic watermarking method disclosed in WO97/49235 and so on.

Furthermore, Japanese Unexamined Patent Publication No. Hei10-164549 discloses a method for detecting alteration of image data by improving the electronic watermarking method disclosed in WO97/49235 and so on so as to embed authentication information in image data in an integral and inseparable manner.

Moreover, in addition to these documents, Japanese Unexamined Patent Publications No. Hei09-151747, Hei10-83310, Hei10-106149, Hei10-161933, Hei10-164349, Hei10-285562, Hei10-334272, Hei-240626, Hei10-240129 and so on also disclose inventions related to the electronic watermarking method.

By the methods disclosed in these documents, authentication information is embedded using a hash function and so on to detect whether or not alteration being added to image data. If alteration is performed by using a hash function to a part of image data in which authentication information is embedded, this alteration influences the entire image data. Thus, while this method can detect alteration being added to some part of image data, it cannot concretely detect and indicate which part of the image data the alteration is added to.

SUMMARY OF THE INVENTION

The present invention was made in the light of the above-mentioned problem of the background arts, and an object of the invention is to provide a contents alteration detection apparatus and a method thereof not only capable of detecting whether or not alteration being added to contents data but also capable of further detecting which part of the contents data the alteration is added to.

The contents alteration detection apparatus involved in the present invention is a contents alteration detection apparatus having a data filling apparatus and a detection apparatus, the data filling apparatus filling certain embedding data to contents data being objective to embed the embedding data, the detection apparatus detecting whether alteration was added to the contents data or not, the data filling apparatus, comprising a contents data dividing means for dividing at least a part of the contents data into a plurality of first blocks and a data filling means for filling each of certain first embedding data to each of the divided first blocks to generate a plurality of second blocks having second embedding data, the detection apparatus, comprising a data extracting means for extracting the second embedding data filled in each of at least a part of the second blocks and an alteration detecting means for detecting whether or not alteration was added to each of at least a part of the second blocks based on the extracted second embedding data.

Preferably, the contents alteration detection apparatus has a data filling apparatus and a detection apparatus, the data filling apparatus filling certain embedding data to image data, the detection apparatus detecting whether alteration was added to the image data or not, the data filling apparatus, comprising an image dividing means for dividing the image data into a plurality of first image blocks and a data filling means for filling each of certain first embedding data to each of the divided first image blocks to generate a plurality of second image blocks having second embedding data, the detection apparatus, comprising a data extracting means for extracting second embedding data filled in each of the second image blocks and an alteration detecting means for detecting whether or not alteration was added to each of the second image blocks based on the extracted second embedding data.

Preferably, the image dividing means divides the image data into the plurality of first image blocks containing a plurality of unit data respectively and the data filling means adjusts a relationship between or among a mutually corresponding plurality of the unit data values contained in each of mutually corresponding two or more of the first image blocks so that it represents the first embedding data according to a certain rule, filling the first embedding data to each of the plurality of first image blocks to generate the second image blocks.

Preferably, the data filling means, in the case that alteration was added to any of the second image blocks, adjusts the mutually corresponding plurality of unit data values contained in the second image blocks to which alteration was added so that the values do not comply with the certain rule.

Preferably, the data extracting means extracts as the second embedding data, from each of the plurality of second image blocks, the data represented according to the certain rule by the relationship between or among the plurality of unit data values contained in each of the second image blocks.

Preferably, the alteration detecting means detects whether or not alteration was added to each of the second image blocks based on results of comparison between the embedded first embedding data and the extracted second embedding data.

Preferably, the first image blocks and the second image blocks are conversion blocks that contain the unit data, and also contain one or more sets of conversion coefficients acquired by dividing image data into certain processing blocks and converting it from a space area into a frequency area, respectively.

Preferably, the first image blocks and the second image blocks are DCT blocks that contain the unit data, and also contain plural sets of DCT coefficients acquired by dividing image data into certain DCT blocks and performing discrete cosine transformation (DCT) process on it.

The alteration detection apparatus involved in the present invention first divides contents data to be processed into a plurality of parts.

The contents data are voice data or image data at an accident location for instance, so it can no longer be used as evidence if alteration is added.

Next, the alteration detection apparatus involved in the present invention embeds embedding data (so-called electronic watermark) in each of plural parts of the above divided contents data by a certain method used for alteration detection and neither influences embedding of data in any other part nor is influenced by any other part when detecting alteration. Namely, the embedding data is embedded in each of plural parts of the contents data in a form closed in each of such parts.

Lastly, the alteration detection apparatus involved in the present invention detects the data embedded in each of the plural parts of the contents data in a form closed in each of such parts by processing it in a process closed in each of such parts, and thus it detects which part of the contents data alteration was added.

Here, the method by which the alteration detection apparatus involved in the present invention divides image data and embeds an electronic watermark (embedding data) in the divided image data can be any method as long as it can be performed in a closed manner to each of the divided image data.

However, as it is necessary to clarify the description, an embodiment is given below. It is a case, for instance, where the alteration detection apparatus involved in the present invention divides image data compressed and encoded by the JPEG method into a plurality of sets (image blocks) each of which includes plural sets of DCT coefficients, and embeds an electronic watermark to each of these sets to allow alteration detection for each set, and thus it detects whether alteration was added to the image data or not for each of these sets.

Also, while it is possible either to have the alteration detection apparatus involved in the present invention detect alteration by embedding the embedding data (electronic watermark) in a part of image data or to allow no match between the area in which the embedding data is embedded and the area where detection of alteration is performed, the following is an embodiment of alteration performed by embedding the embedding data in the entire image data.

In addition, there is an embodiment where, as the DCT coefficients being objective to embed the embedding data (electronic watermark) by the alteration detection apparatus involved in the present invention, for instance, luminance component (Y) of color image data is rendered in a plurality of DCT blocks (macro blocks) of 88-pixel composition, and the DCT coefficients acquired by performing DCT process on these DCT blocks are used.

Also, as a method for selecting sets each of which includes plural sets of DCT coefficients, a method is thinkable, such as randomly selecting DCT coefficients by using a random number to make a set or simply selecting neighboring DCT coefficients to make a set. Unless otherwise specified, however, the embodiment described hereafter is the simplest case which is the latter of the above two examples, namely a case where each set of DCT coefficients is a pair including two sets (neighboring two) of DCT coefficients acquired by simply DCT-converting two neighboring DCT blocks.

In the alteration detection apparatus in accordance with the present invention, a data filling apparatus embeds embedding data (electronic watermark) in image data to allow alteration detection for each pair of DCT coefficients.

In a data filling means, for instance, an image dividing means decodes in Huffman code compressed image data compressed and encoded by the JPEG method, and accepts DCT coefficients of luminance component (Y) out of the three types of image data components resulting from the decoding process to associate with the two neighboring DCT coefficients, and generates a pair comprised of two sets of the associated DCT coefficients (first image block).

A data filling means takes out one or more of the two sets of DCT coefficients (unit data) contained in each pair (first image block) mutually associating them (a plurality of unit data is selected from a pair since one or more are taken out from each of the two sets of DCT coefficients).

In addition, a data filling means generates a random number by using key information, and uses the generated random number to scramble 96-bit embedding data, for instance.

A data filling means associates each of a pair (first image block) with each bit of the scrambled embedding data (first embedding data).

Furthermore, a data filling means adjusts values of the DCT coefficients so that a relationship between the DCT coefficients (unit data) taken out of each of the two sets of them included in a pair (first image block) and mutually corresponding between these two sets represents according to a certain rule the value (1 or 0) of the embedding data's bit (first embedding data) associated with the pair (first image block) that included these DCT coefficients, and thus it embeds embedding data.

A method for selecting DCT coefficients from the two sets of DCT coefficients included in a pair (first image block) may be, for instance, either to select DCT coefficients based on a preset and fixed corresponding relationship or coefficients selected by randomly associating DCT coefficients based on a random number.

Unless otherwise specified, to clarify the description, the embodiment described hereafter is a case where mutually corresponding three DCT coefficients each (total six) are randomly selected from each of the two sets of DCT coefficients included in each pair (first image block), namely a case where DCT coefficients are selected from different positions in the case of different pairs and they are selected from the same positions if included in the same pair.

Thus, if the embedding data's bit is embedded in each pair, any alteration added to a pair does not influence any other pair, unlike a case where a hash function is used to embed embedding data.

Namely, if embedded in this way, alteration to a part of an image does not influence any other part of the image, so it is possible to detect alteration added to the image part by part.

After each bit of embedding data (first embedding data) is embedded, if alteration is added, such as filling in a part of image data to erase an object seen there, the relationship between or among mutually corresponding DCT coefficients (unit data) included in a pair (second image block) of a part to which alteration was added deviates from the certain rule, and the bit of the embedding data (second embedding data) shows a different value from the bit of the embedding data (first embedding data) when it was embedded.

Also, if 96-bit embedding data (first embedding data) is embedded in a pair (first image block) of 6144 sets of DCT coefficients comprising an image comprised of 1024 bits×768 bits, each bit of the embedding data (first embedding data) is embedded in one image data 64 times.

On the other hand, if alteration was added only to a part of small area of image data, the number of pairs that do not represent the bit of corresponding embedding data (first embedding data) in the part to which alteration was added should be smaller than the number of pairs that represent the bit of corresponding embedding data (first embedding data) in the part to which alteration was not added.

Accordingly, if the embedding data (second embedding data) is extracted from an image to which alteration was possibly added, and decision by majority is made as to which value of 1 or 0 each of 64 pairs corresponding to the same bit as that of the embedding data (first embedding data) represents according to the certain rule, it may be determined that the value represented by the majority of pairs is the value of the embedding data (first embedding data) filled by the data filling apparatus.

Likewise, as a result of this decision by majority, it can be estimated that alteration was added to the positions of the pairs (second image block) that became minority.

The detection apparatus involved in the present invention exploits such nature of embedding data, and its extracts, from each of the pairs of DCT coefficients (second embedding data) to which alteration was possibly added, the embedding data (second embedding data) of which value may be changed from the initially embedded value as a result of alteration.

In addition, the detection apparatus detects, based on these extraction results, to which pairs of DCT coefficients (second image data) alteration was added, namely, to which part of image data alteration was added.

The data extracting means extracts a value represents according to the certain rule by the mutually corresponding DCT coefficients (unit data) contained in each of two sets of DCT coefficients of the pair (second image block) to which alteration was possibly added after the embedding data (first embedding data) was embedded by the data filling apparatus involved in the present invention.

The alteration detecting means makes decision by majority as to which value of 1 or 0 a plurality of pairs (second image block) corresponding to the same bit as that of the embedding data represent, and it determines that the value represented by the majority of pairs is the value of the embedding data (first embedding data) when it was embedded, and also determines that alteration was added to any pair (second image block) representing a different value from this embedding data.

The data filling apparatus involved in the present invention is a data filling apparatus for filling certain embedding data to image data for detecting whether alteration was added to the image data or not, the detection was performed by detecting whether or not alteration was added to each of the second image blocks based on the second embedding data filled in each of the image blocks, the data filling apparatus comprising an image dividing means for dividing image data into a plurality of first image blocks, and a data filling means for filling each of certain first embedding data to each of said divided first image blocks to generate the plurality of second image blocks.

The detection apparatus involved in the present invention is a detection apparatus for detecting whether or not alteration was added to each of a plurality of second image blocks generated by dividing image data into a plurality of first image blocks and filling each of certain first embedding data to each of the divided first image blocks comprising a data extracting means for extracting embedding data filled in each of the second image blocks (second embedding data), and an alteration detecting means for detecting whether or not alteration was added to each of the second image blocks based on the extracted second embedding data.

The alteration detection method involved in the present invention is a contents alteration detection method for filling certain embedding data to contents data being objective to embed the embedding data and detecting whether alteration was added to the contents data or not while dividing the contents data into a plurality of first data blocks, filling each of certain first embedding data to each of the divided first data blocks to generate a plurality of second blocks, extracting the embedding data filled in each of the second blocks (second embedding data) and detecting whether or not alteration was added to each of the second blocks based on the extracted second embedding data.

Also, in a contents alteration detection apparatus having a data filling apparatus and a detection apparatus, wherein the data filling apparatus fill certain embedding data to image data and the detection apparatus detects whether alteration was added to the image data or not, the first medium involved in the present invention carries a program for having a computer execute the steps of dividing image data into a plurality of first image blocks, filling each of certain first embedding data to each of the divided first image blocks to generate a plurality of second image blocks, extracting embedding data filled in each of the second image blocks (second embedding data), and detecting whether or not alteration was added to each of the second image blocks based on the extracted second embedding data.

Also, in a data filling apparatus for filling certain embedding data to image data so as to detect whether or not alteration was added to image data, the detection is performed, based on second embedding data filled to each of a plurality of second image blocks contained in the image data, by detecting whether or not alteration was added to each of the image blocks, the second medium involved in the present invention carries a program for having a computer execute the steps of dividing image data into a plurality of first image blocks, and filing each of certain first embedding data to each of the divided first image blocks to generate a plurality of second image blocks.

Also, in a detection apparatus for detecting whether or not alteration was added to each of a plurality of second image blocks generated by dividing image data into a plurality of first image blocks and filing each of certain first embedding data to each of the divided first image blocks, the third medium involved in the present invention carries a program for having a computer execute the steps of extracting embedding data filled in each of the second image blocks (second embedding data) and detecting whether or not alteration was added to each of the second image blocks based on the extracted second embedding data.

BRIEF DESCRIPTION OF THE DRAWINGS

Preferred embodiments of the present invention will now be described, by way of example only, with reference to the accompanying drawings in which:

FIG. 2 is a diagram showing configuration of embedding/detection program implemented by image alteration detection apparatus shown in FIG. 1 to implement the alteration detecting method involved in the present invention.

FIG. 5 is a diagram illustrating non-compressed image data photographed by the digital camera (FIG. 1).

FIG. 22 is a diagram showing, in the case that no alteration/error was added to JPEG data generated by the embedding part (FIGS. 2 and 3), the value of the bit that the extraction part extracts from each pair contained in JPEG data with no alteration, etc. added.

FIG. 34 is a diagram showing association of embedding data's bits with each of the pixel blocks shown in FIG. 33.

FIG. 35(A), (B) are diagrams showing a process of the embedding part shown in FIG. 30 to embed the bit of value 1 in the pixel block shown in FIG. 32, showing a case where a pixel value is manipulated.

FIG. 36 is a diagram showing a process of the embedding part shown in FIG. 30 to embed the bit of value 1 in the pixel block shown in FIG. 32, showing a case where a pixel value is not manipulated.

FIG. 37(A), (B) are diagrams showing a process of the embedding part shown in FIG. 30 to embed the bit of value 0 in the pixel block shown in FIG. 32, showing a case where a pixel value is manipulated.

FIG. 38 is a diagram showing a process of the embedding part shown in FIG. 30 to embed the bit of value 0 in the pixel block shown in FIG. 32, showing a case where a pixel value is not manipulated.

FIG. 39 is a diagram illustrating the process of the extraction part shown in FIG. 30.

DETAILED DESCRIPTION OF THE PREFERRED EMBODIMENTS OF THE INVENTION

Hereafter, the first embodiment of the present invention is described.

Figure 1:
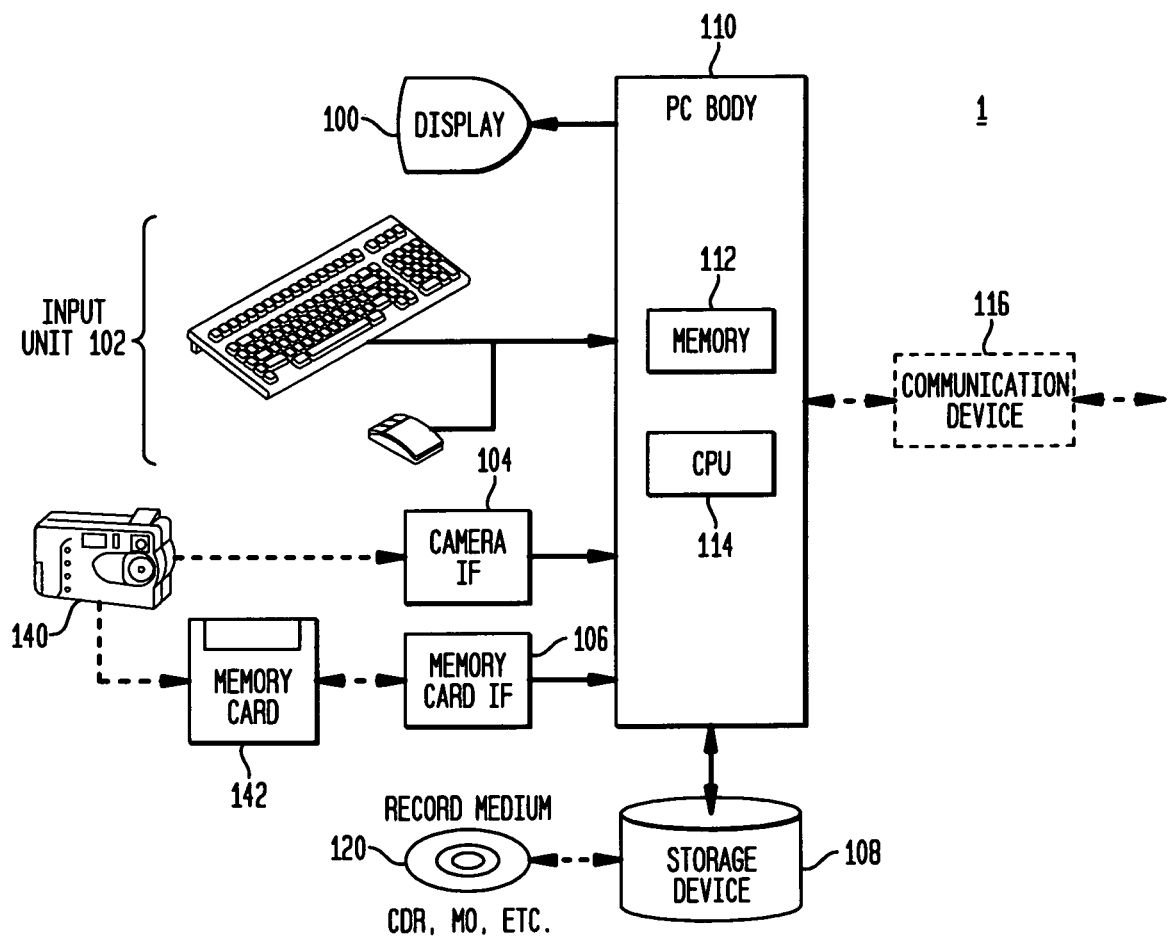
FIG. 1 is a diagram showing configuration of image alteration detection apparatus for implementing the first alteration detecting method involved in the present invention.

FIG. 1 is a diagram showing configuration of image alteration detection apparatus 1 for implementing the alteration detecting method in accordance with the present invention.

As shown in FIG. 1, image alteration detection apparatus 1 comprises display 100 that is a CRT display or an LCD, etc., input unit 102 including a keyboard, mouse, etc., digital camera interface (camera IF) IF 104, memory card interface (memory card IF) 106, storage device 108 that is an MO drive or a CD drive, and the computer body (PC body) 110 including memory 112 and the microprocessor (CPU) 114, etc., and communication device 116 is further added as required.

Namely, image alteration detection apparatus 1 adopts a configuration wherein camera IF 104 and memory card IF 106 are added to an ordinary computer.

Image alteration detection apparatus 1 loads into memory 112 and runs embedding/detection program 2 (described later referring to FIG. 2) supplied to storage device 108 being recorded on a magneto-optical disk (MO) or a compact disk (CD) by these components, and embeds an electronic watermark (embedding data) in image data and detects alteration (regardless of whether it is artificially added or caused by an accident such as data corruption).

Namely, image alteration detection apparatus 1 accepts via camera IF 104 an image photographed by digital camera 140 such as compressed image data compressed and encoded by the JPEG method. Or it accepts via memory card IF 106 compressed image data recorded on memory card 142 by digital camera 140.

When image alteration detection apparatus 1 accepts compressed image data, it embeds an electronic watermark (embedding data) in the compressed image data and detects, by using the embedded electronic watermark (embedding data), to which part of the data alteration was added.

FIG. 2 is a diagram showing configuration of embedding/detection program 2 implemented by image alteration detection apparatus 1 shown in FIG. 1 to implement the first alteration detecting method.

As shown in FIG. 2, embedding/detection program 2 is comprised of embedding/extraction part 3, key information database (DB) 22 and image database (DB) 24, where embedding/extraction part 3 comprises embedding data generation part 20, control part 26, embedding part 30, extraction part 40 and OS 50.

OS 50 is operating system software such as Windows (a product name by Microsoft Corp.) That controls running of each component of embedding/detection program 2.

OS 50 also supplies data necessary for processing of each component of embedding/detection program 2, for example, supplying data necessary for generating an electronic watermark (embedding data) including serial number of memory card 142 and time etc. to embedding data generation part 20.

Control part 26 displays a GUI image (not illustrated) for operations on display 100, accepts user operations to the displayed GUI image and supplies operation data showing accepted operations to each component of embedding/detection program 2 as required.

Control part 26 also controls operation of each component of embedding/detection program 2 according to the accepted user operations.

Image DB 24 stores/manages compressed image data (JPEG data) in which embedding part 30 embedded embedding data in record medium 120 inserted into storage device 108 or memory card 142 inserted into memory card IF 106, and reads stored/managed image data and outputs it to extraction part 40.

Key information DB 22 stores/manages in storage device 108 and so on key information associating JPEG data managed by image DB 22 with a key (such as a numeric value of 64 bits) used by embedding part 30 to generate a random number when embedding data in this JPEG data, and reads stored/managed key information and outputs it to embedding part 30 and extraction part 40.

Embedding data generation part 20 generates 96-bit embedding data from data such as a memory serial number input from OS 50, and outputs it to embedding part 30.

Figure 3:
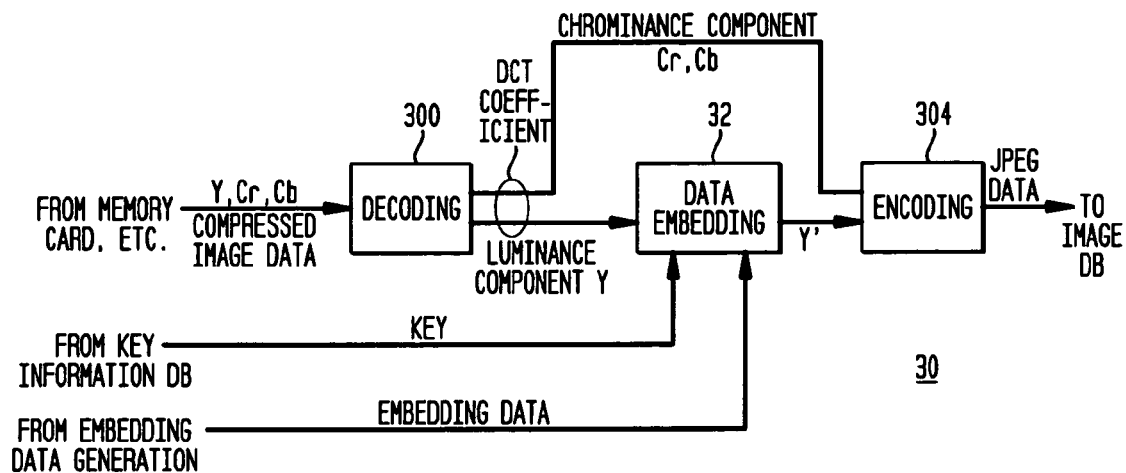
FIG. 3 is a diagram showing configuration of embedding part 30 shown in FIG. 2.

FIG. 3 is a diagram showing configuration of embedding part 30 illustrated in FIG. 2.

Figure 4:
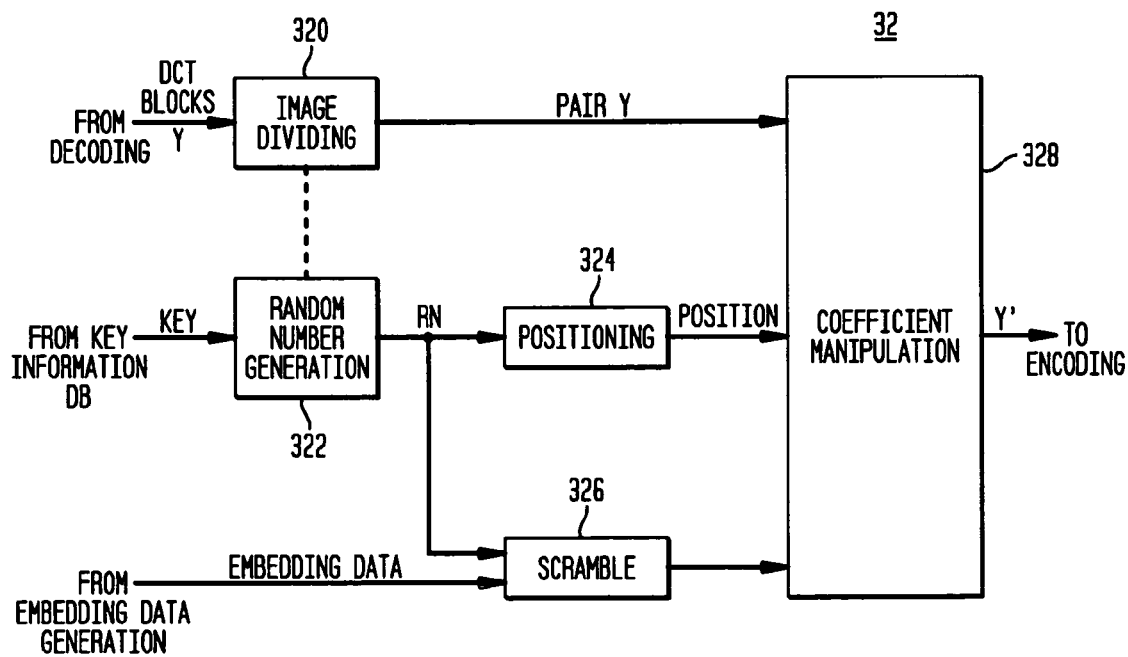
FIG. 4 is a diagram showing configuration of data embedding part 32 shown in FIG. 3.

FIG. 4 is a diagram showing configuration of data embedding part 32 illustrated in FIG. 3.

As shown in FIG. 3 and FIG. 4, embedding part 30 is comprised of decoding part 300, data embedding part 32 and encoding part 304, and data embedding part 32 is comprised of image dividing part 320, random number generation part 322, positioning part 324, scramble part 326 and coefficient manipulation part 328.

Based on these components, embedding part 30 first renders as a plurality of pairs (first image block) each of which includes two sets of DCT coefficients the DCT coefficients of luminance component Y for instance, out of the DCT coefficients comprised of 8 pixels×8 pixels per set (64 pixels per set) of chrominance components Cb, Cr and luminance component Y comprising color compressed Image data.

Embedding part 30 further embeds in each of these pairs the 96-bit embedding data generated by embedding data generation part 20, for instance, as each bit of data scrambled based on a random number generated by a 16-bit linear congruence method (first embedding data; for simpler description, such "scrambled embedding data" is also referred to merely as "embedding data" hereafter) by using key information supplied by key information DB 22 (FIG. 2).

Details of processing of embedding part 30 is described by further referring to FIG. 5 to FIG. 16.

FIG. 5 is a diagram illustrating non-compressed image data photographed by digital camera 140 (FIG. 1).

Figure 6A:
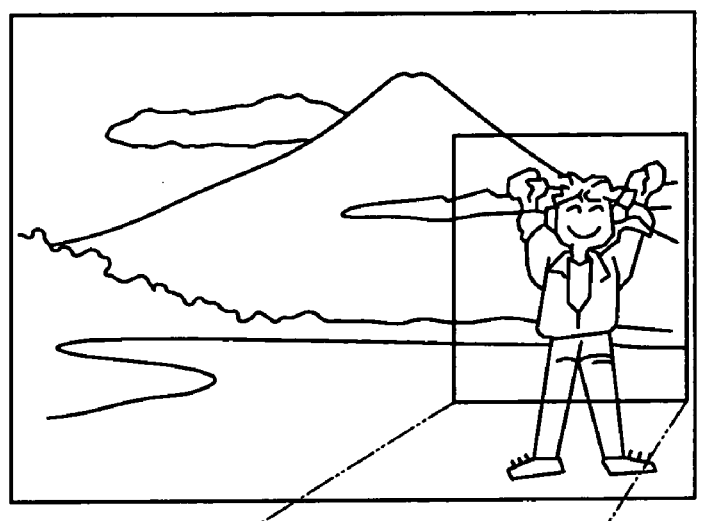
FIG. 6(A) is a diagram showing a part of non-compressed image data illustrated in FIG. 5, (B) is a diagram showing DCT blocks (macro blocks) contained in the non-compressed image data (part) illustrated in (A), and (C) is a diagram showing pixels of 88-Pixel configuration contained in each of the DCT blocks shown in (B).
Figure 6B:
Figure 6C:
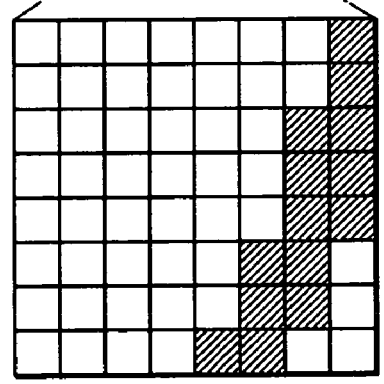

FIG. 6(A) is a diagram showing a part of non-compressed image data illustrated in FIG. 5, FIG. 6(B) is a diagram showing DCT blocks (macro blocks) contained in the non-compressed image data (part) illustrated in FIG. 6(A) and FIG. 6(C) is a diagram showing 8×8 pixels of configuration contained in each of the DCT blocks shown in FIG. 6(B). Moreover, it is basically necessary to distinguish a DCT block from DCT coefficients of 8×8 configuration. For simpler description, however, DCT coefficients of 8×8 composition are also referred to as a DCT block, and each DCT coefficient included in a DCT block of 8×8 composition is referred to as a DCT coefficient hereafter.

Digital camera 140 (FIG. 1), for instance, photographs a person and a landscape, generates non-compressed color image data illustrated in FIG. 5, and further compresses and encodes it by the JPEG method.

Namely, as illustrated in FIG. 6(A) to (C), digital camera 140 divides each of luminance component Y and chrominance components Cr, Cb contained in acquired non-compressed image data into DCT blocks (also refereed to as macro blocks) containing 8×8 (64) pixels respectively, DCT-converts the divided DCT blocks and further renders them in Huffman code to generate compressed image data of the JPEG method, which is output to embedding part 30 (FIGS. 2 and 3) of embedding/detection program 2 run by PC body 110 (FIG. 1) via camera IF 104 or via memory card 142 and memory card IF 106.

Figure 7:
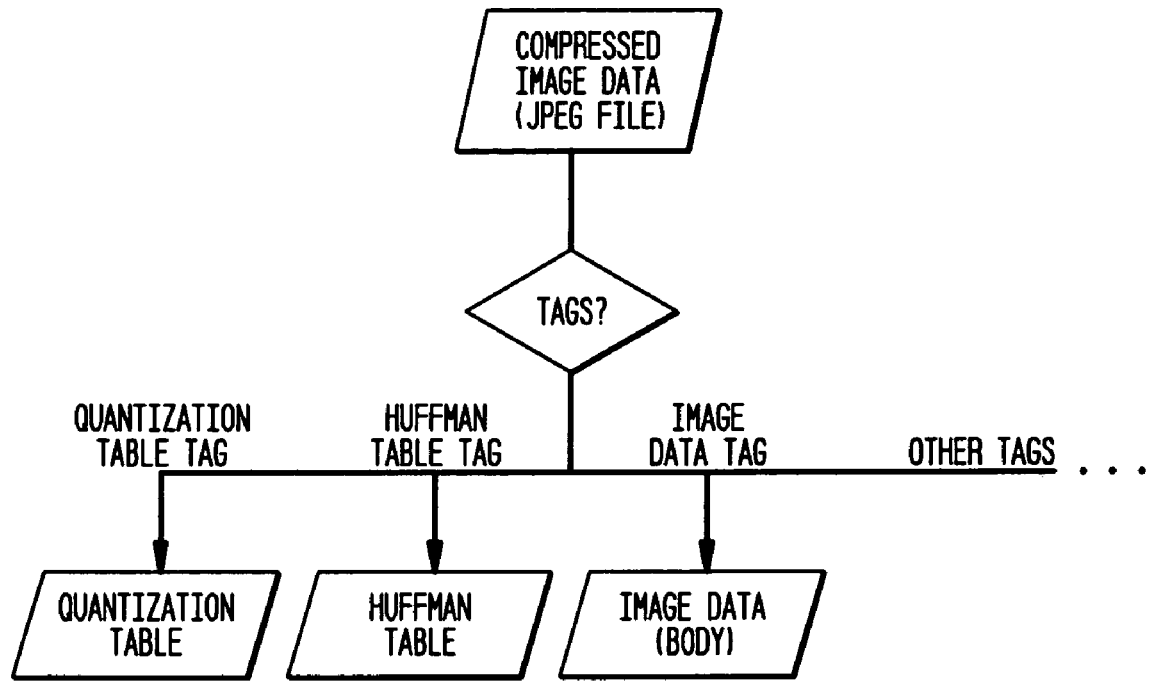
FIG. 7 is a diagram showing compressed image data of the JPEG method generated by the digital camera shown in FIG. 1.

FIG. 7 is a diagram showing compressed image data of the JPEG method generated by digital camera 140 illustrated in FIG. 1.

As shown in FIG. 7, digital camera 140 generates compressed image data of the JPEG method in the form of image data itself and further as data such as a quantization table and a Huffman table required for reverse quantization and decoding processes at extension decoding and a file (JPEG file) containing tags for identifying each of these data.

Figure 8:
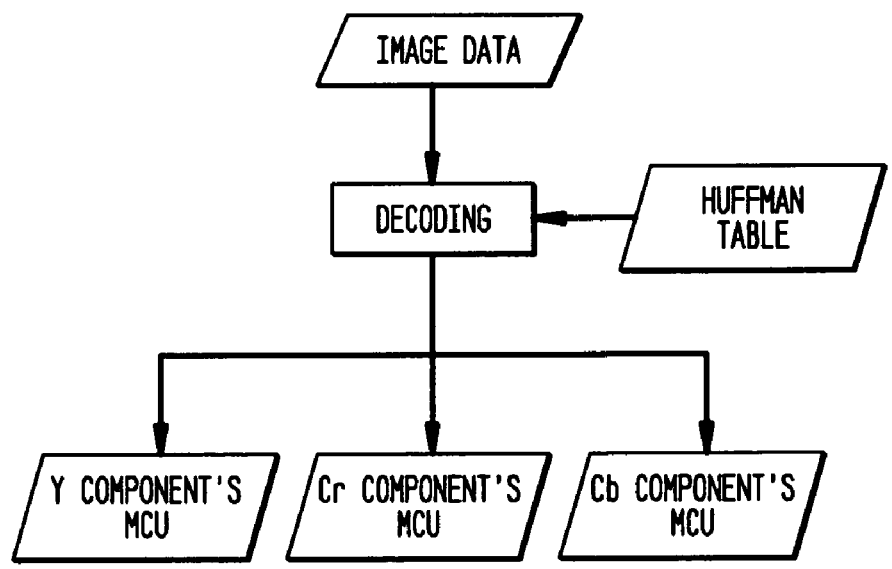
FIG. 8 is a diagram showing the Huffman decoding process of decoding part shown in FIG. 3.

FIG. 8 is a diagram showing the Huffman decoding process of decoding part 300 illustrated in FIG. 3.

Figure 9A:
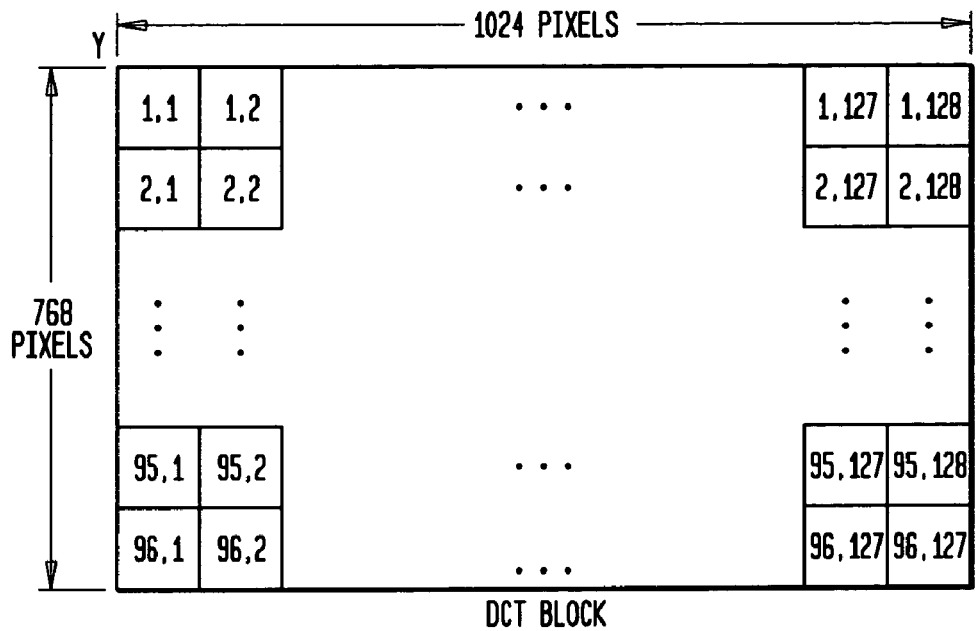
FIG. 9(A) is a diagram showing the DCT coefficients of intensity signal Y acquired by decoding part by decoding in Huffman code compressed image data input from the digital camera, (B) is a diagram showing a method for associating mutually neighboring two sets out of the DCT coefficients of intensity signal Y shown in (A), and (C) is a diagram showing the pairs of the DCT coefficients associated by the method shown in (B).
Figure 9B:
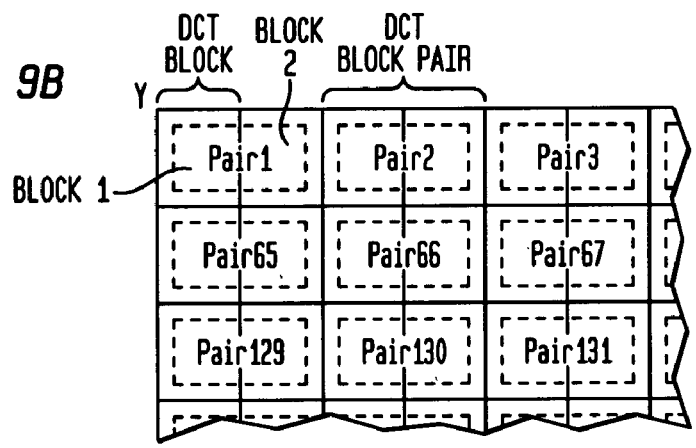
Figure 9C:
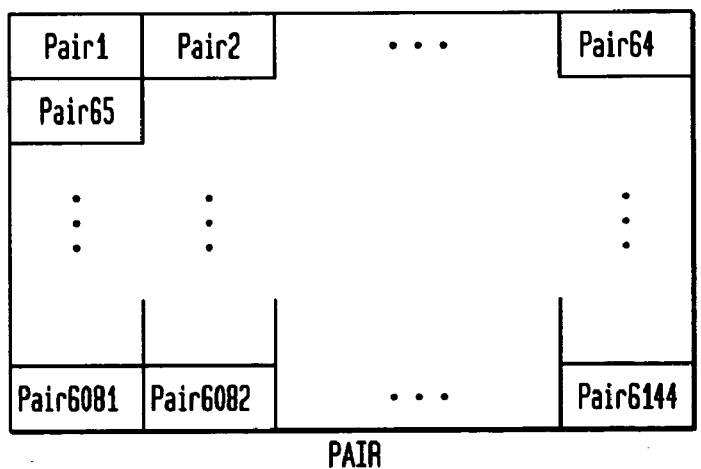

FIG. 9(A) is a diagram showing the DCT coefficients of intensity signal Y acquired by decoding part 300 by decoding in Huffman code compressed image data input from digital camera 140 FIG. 9 (B) is a diagram showing a method for associating mutually neighboring two sets out of the DCT coefficients of intensity signal Y illustrated in FIG. 9(A), and FIG. 9(C) is a diagram showing the pairs of the DCT coefficients associated by the method illustrated in FIG. 9(B).

Embedding part 30, as shown in FIG. 8, first decodes in Huffman code the input JPEG-method compressed image data by using the Huffman table contained in the JPEG file (FIG. 7) to obtain an MCU (minimum code unit) of luminance component Y and chrominance components Cr, Cb.

This MCU actually DCT-processes non-compressed image data, and further handles quantized data by using a quantization table. For simpler description, however, it is merely referred to as a DCT block hereafter. Also, each coefficient contained in an MCU is a value of a DCT coefficient quantized by using a quantization table.

For simpler description, however, it is merely referred to as a DCT coefficient hereafter.

Furthermore, embedding part 30 renders, out of these acquired DCT blocks, 12288 DCT blocks (1, 1 to 96, 128) of luminance component Y shown in FIG. 9(A) into 6144 (12288/2) pairs of neighboring two (blocks 1 and 2) as shown in FIGS. 9(B) and (C).

Embedding part 30 repeatedly associates each bit of 96-bit embedding data scrambled by a random number as mentioned above 64 times with each of thus acquired 6144 (96×64) pairs.

Figure 10:
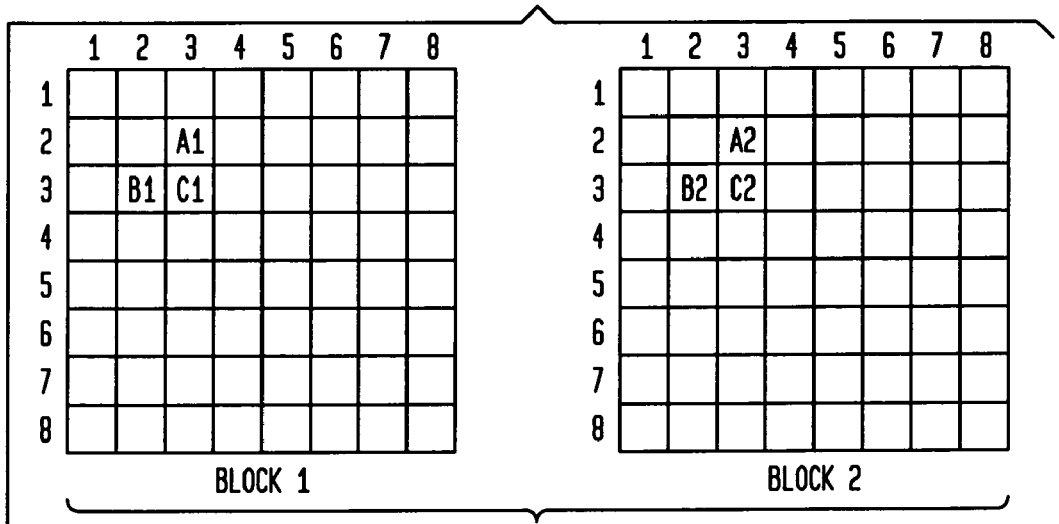
FIG. 10 is a diagram illustrating mutually corresponding DCT coefficients selected from each of the DCT blocks (blocks 1 and 2) included in one pair (FIGS. 9(A) and (B)) by the embedding part shown in FIGS. 2 and 3.

FIG. 10 is a diagram illustrating mutually corresponding DCT coefficients selected from each of the DCT blocks (blocks 1 and 2) included in one pair (FIGS. 9(A) and (B) by the embedding part 30 shown in FIGS. 2 and 3.

Moreover, FIG. 10 illustrates a case where three DCT coefficients of the same position (2,3), (3,2) and (3, 3) are selected from each of the two DCT blocks (blocks 1 and 2) included in pair ($1 \leq i \leq 6144$).

Embedding part 30 randomly selects, for instance, by using a random number generated as mentioned above from a key supplied from key information DB 22 (FIG. 2), three mutually corresponding DCT coefficients ($A_1$, $A_2$, $B_1$, $B_2$, $C_1$, $C_2$; unit data) within the DCT blocks (blocks 1 and 2) per pair as shown in FIG. 10. In other words, embedding part 30 selects, for embedding the bit, DCT coefficients of the same position from the DCT blocks (blocks 1 and 2) contained in the same pair, but it selects DCT coefficients of different positions among different pairs.

Figure 11A:
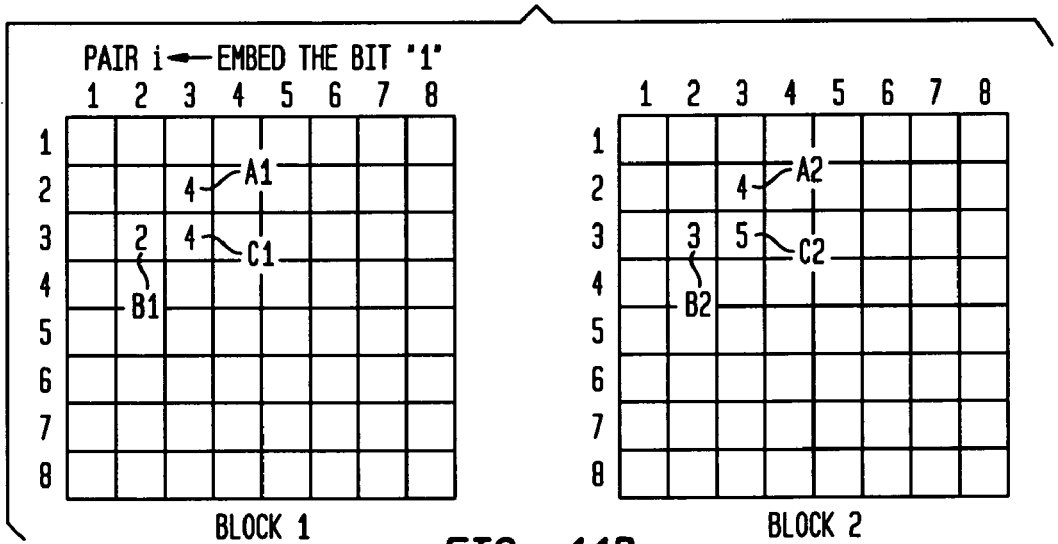
FIGS. 11(A) and (B) are diagrams illustrating a case where, in order to embed the embedding data's bit (value 1) in each of the selected DCT coefficients of blocks 1 and 2 as illustrated in FIG. 10, it is necessary to change numeric values of the DCT coefficients.

FIGS. 11(A) and (B) are diagrams illustrating a case where, in order to embed the embedding data's bit (value 1) in each of the selected DCT coefficients of blocks 1 and 2 as illustrated in FIG. 10, it is necessary to change numeric values of the DCT coefficients.

Figure 12:
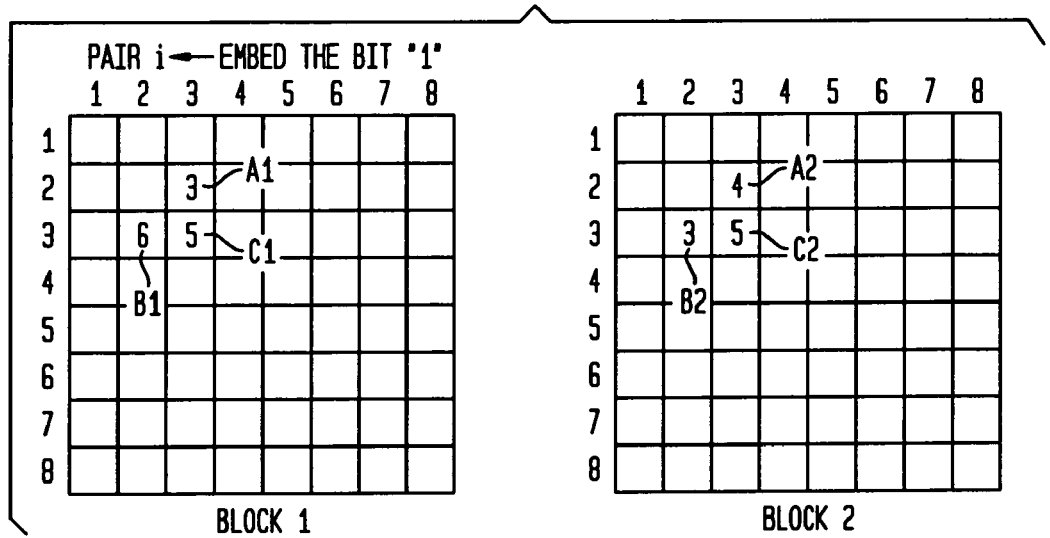
FIG. 12 is a diagram illustrating a case where, in order to embed the embedding data's bit (value 1) in each of the selected DCT coefficients of blocks 1 and 2 as illustrated in FIG. 10, it is not necessary to change numeric values of the DCT coefficients.

FIG. 12 is a diagram illustrating a case where, in order to embed the embedding data's bit (value 1) in each of the selected DCT coefficients of blocks 1 and 2 as illustrated in FIG. 10, it is not necessary to change numeric values of the DCT coefficients.

Figure 13A:
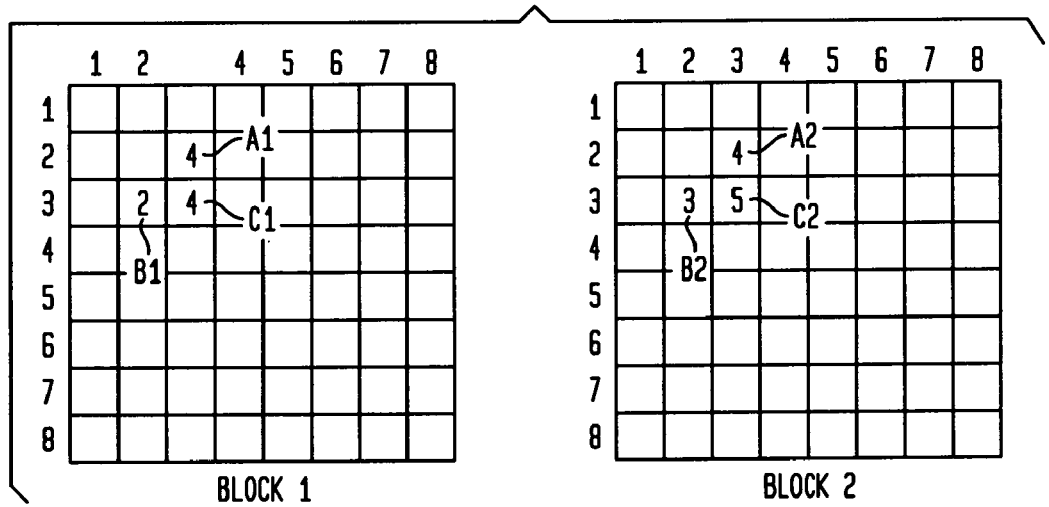
FIGS. 13(A) and (B) are diagrams illustrating a case where, in order to embed the embedding data's bit (value 0) in the selected DCT coefficients of each of blocks 1 and 2 as illustrated in FIG. 10, it is necessary to change numeric values of the DCT coefficients.

FIGS. 13(A) and (B) are diagrams illustrating a case where, in order to embed the embedding data's bit (value 0) in the selected DCT coefficients of each of blocks 1 and 2 as illustrated in FIG. 10, it is necessary to change numeric values of the DCT coefficients.

Figures 14, 15:
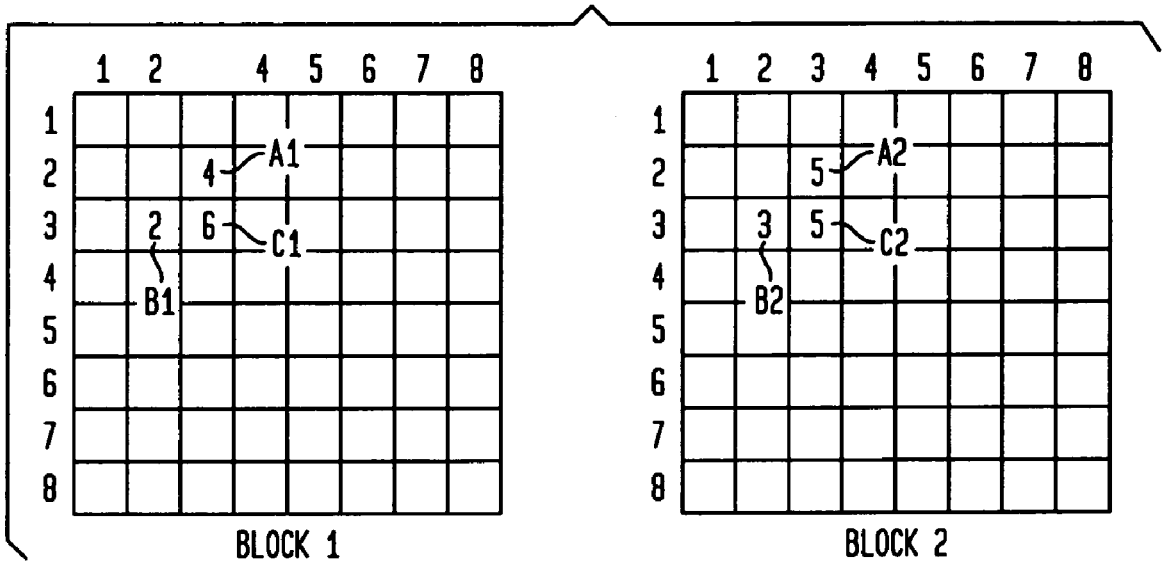
FIG. 14 is a diagram illustrating a case where, in order to embed the embedding data's bit (value 0) in the selected DCT coefficients of each of blocks 1 and 2 as illustrated in FIG. 10, it is not necessary to change numeric values of the DCT coefficients.
FIG. 15 is a diagram illustrating an embedding table used by the embedding part (FIGS. 2 and 3) to embed embedding data in DCT blocks.

FIG. 14 is a diagram illustrating a case where, in order to embed the embedding data's bit (value 0) in the selected DCT coefficients of each of blocks 1 and 2 as illustrated in FIG. 10, it is not necessary to change numeric values of the DCT coefficients.

Embedding part 30 adjusts, for instance, as illustrated in FIG. 10, the relationship among mutually corresponding DCT coefficients ($A_1$, $A_2$, $B_1$, $B_2$, $C_1$, $C_2$) selected from the two DCT blocks (blocks 1 and 2) of pair i so that it complies with the rule illustrated in the following Table 1 (rule 1-1 and 1-2) according to the value of the embedding data's bit associated with each of the pairs as mentioned above and as illustrated in FIGS. 11(A) and (B), in FIG. 12, FIGS. 13(A) and (B) and FIG. 14, and thus it embeds the value (1,0) of the corresponding embedding data's bit in each pair.

TABLE 1

A rule showing the relationship among DCT coefficients:

If the value of the embedding data's bit associated with a pair is 1:

$(A_1 < A_2 \,\&\&\, B_1 < B_2 \,\&\&\, C_1 < C_2) \,\|$
$(A_1 < A_2 \,\&\&\, B_1 < B_2 \,\&\&\, C_1 < C_2) \,\|$
$(A_1 < A_2 \,\&\&\, B_1 < B_2 \,\&\&\, C_1 < C_2) \,\|$
$(A_1 < A_2 \,\&\&\, B_1 < B_2 \,\&\&\, C_1 < C_2)$

... (Rule 1-1)

If the value of the embedding data's bit associated with a pair is 0:

$(A_1 < A_2 \,\&\&\, B_1 < B_2 \,\&\&\, C_1 > C_2) \,\|$
$(A_1 < A_2 \,\&\&\, B_1 < B_2 \,\&\&\, C_1 < C_2) \,\|$
$(A_1 < A_2 \,\&\&\, B_1 < B_2 \,\&\&\, C_1 < C_2) \,\|$
$(A_1 < A_2 \,\&\&\, B_1 < B_2 \,\&\&\, C_1 > C_2)$

Provided that, in the above rules 1-1 and 1-2, X&&Y indicates that both conditions X and Y are met, and X∥Y indicates that one of the conditions X and Y is met.

For instance, as illustrated in FIG. 11(A), if the value of the embedding data's bit associated with pair i is 1, and the values of the mutually corresponding DCT coefficients $A_1, A_2, B_1, B_2, C_1, C_2$ of the two DCT blocks (blocks 1 and 2) of pair i are 4, 4, 2, 3, 4 and 5 respectively, the relationship among the values of these DCT coefficients is $A_1 = A_2$ which meets neither 1-1 nor 1-2 of the above rules.

Figure 11B:
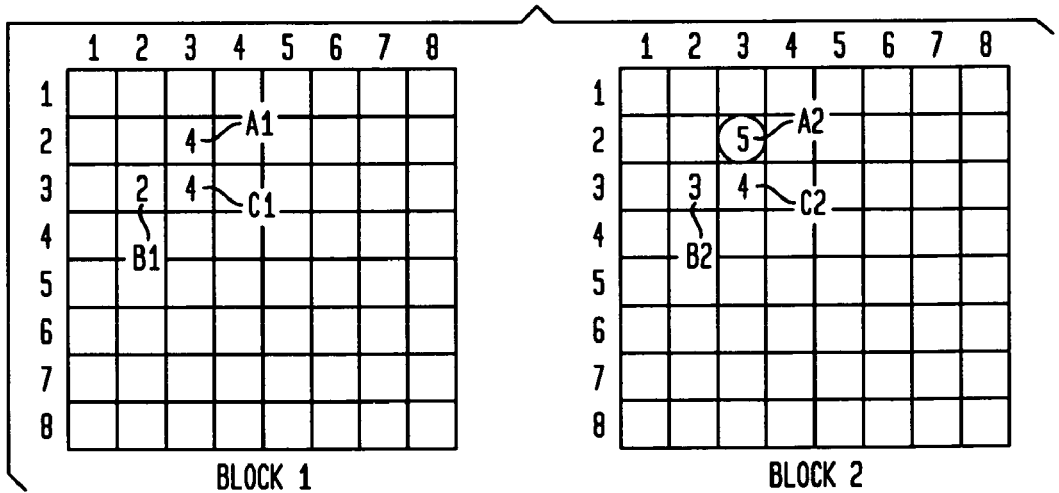

Therefore, as illustrated by circling a number in FIG. 11 (B), embedding part 30 increases the value of $A_2$ so that the relationship among the values of the mutually corresponding DCT coefficients ($A_1, A_2, B_1, B_2, C_1, C_2$) can meet the condition of ($A_1 < A_2 \,\&\&\, B_1 < B_2 \,\&\&\, C_1 < C_2$) of the above rule 1-1, and thus it embeds the embedding data's bit of value 1.

Namely, in the case of embedding the bit of value 1 for instance, embedding part 30 always adjusts the DCT coefficients if the values of the DCT coefficients ($A_1, A_2, B_1, B_2$, $C_1, C_2$) can meet the condition of $(A_1<A_2 \&\& B_1<B_2 \&\& C_1<C_2)$ of the above rule 1-1 and so that the change of the values of the DCT coefficients will be minimum before and after the adjustment, and thus it embeds the embedding data's bit of value 1.

Also, for instance, as illustrated in FIG. 12, if the value of the embedding data's bit associated with pair i is 1, and the values of the mutually corresponding DCT coefficients ($A_1$, $A_2, B_1, B_2, C_1, C_2$) of the two DCT blocks (blocks 1 and 2) of pair i are 3, 5, 6, 3, 5 and 4 respectively, the relationship among the values of these DCT coefficients meets the condition of $(A_1<A_2 \&\& B_1>B_2 \&\& C_1>C_2)$ of the above rule 1-1.

Accordingly, in this case, embedding part 30 does not change the values of the DCT coefficients ($A_1, A_2, B_1, B_2, C_1, C_2$) of the two DCT blocks (blocks 1 and 2) of pair i.

For instance, as illustrated in FIG. 13(A), if the value of the embedding data's bit associated with pair i is 0, and values of the mutually corresponding DCT coefficients ($A_1$, $A_2, B_1, B_2, C_1, C_2$) of the two DCT blocks (blocks 1 and 2) of pair i are 4, 4, 2, 3, 4 and 5 respectively, the relationship among the values of these DCT coefficients is $A_1=A_2$ which meets neither 1-1 nor 1-2 of the above rules.

Figure 13B:
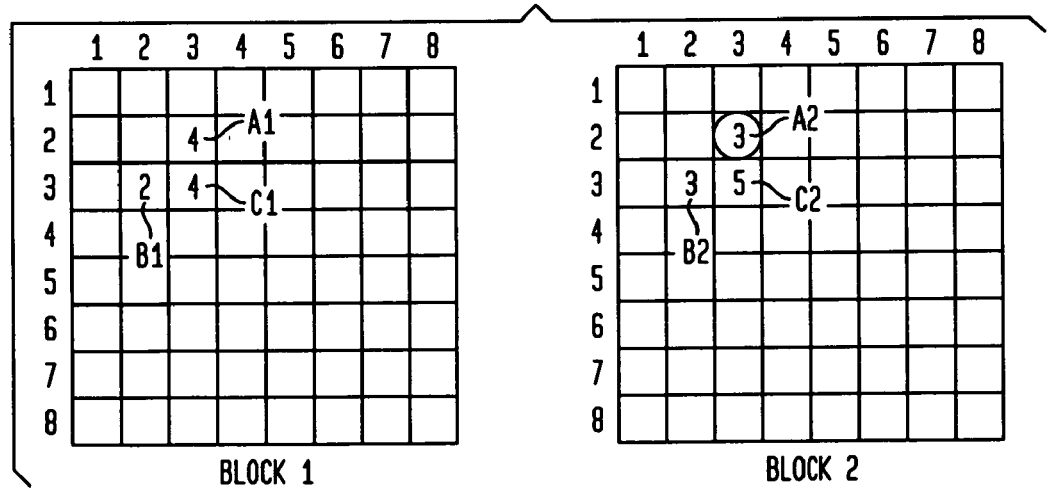

Therefore, as illustrated by circling a number in FIG. 13 (B), embedding part 30 decreases the value of $A_2$ so that the relationship among the values of the mutually corresponding DCT coefficients ($A_1, A_2, B_1, B_2, C_1, C_2$) can meet the condition of $(A_1<A_2 \&\& B_1<B_2 \&\& C_1<C_2)$ of the above rule 1-2, and thus it embeds the embedding data's bit of value 0.

Namely, in the case of embedding the bit of value 0 for instance, embedding part 30 always adjusts the DCT coefficients if the values of the DCT coefficients ($A_1, A_2, B_1, B_2$, $C_1, C_2$) do not meet the above rule 1-2, so that the relationship among these DCT coefficients can meet the condition of $(A_1<A_2 \&\& B_1<B_2 \&\& C_1<C_2)$ of the above rule 1-2 and so that the change of the values of the DCT coefficients will be minimum before and after the adjustment, and thus it embeds the embedding data's bit of value 0.

Also, for instance, as illustrated in FIG. 14, if the value of the embedding data's bit associated with pair 1 is 0, and the values of the mutually corresponding DCT coefficients ($A_1$, $A_2, B_1, B_2, C_1, C_2$) of the two DCT blocks (blocks 1 and 2) of pair i are 4, 5, 2, 3, 6 and 5 respectively, the relationship among the values of these DCT coefficients meets the condition of $(A_1<A_2 \&\& B_1<B_2 \&\& C_1>C_2)$ of the above rule 1-2. Accordingly, in this case, embedding part 30 does not change the values of the DCT coefficients ($A_1, A_2, B_1, B_2$, $C_1, C_2$) of the two DCT blocks (blocks 1 and 2) of pair 1.

FIG. 15 is a diagram illustrating an embedding table used by embedding part 30 (FIGS. 2 and 3) to embed embedding data in DCT blocks.

Moreover, while embedding data bit columns appears in FIG. 15, these columns are shown in order to explain that embedding data is scrambled and are not used in actual processing.

The embedding process of embedding part 30 explained so far is further described by referring to FIG. 15.

Embedding part 30 associates two neighboring DCT blocks (FIG. 9(A) to (c)) out of these 12288 DCT blocks acquired from image data comprised of 1024 pixels×768 pixels (FIG. 5, 6 (A) to (c)) and makes 6144 pairs.

Embedding part 30 also scrambles 96-bit embedding data supplied from embedding data generation part 20 (FIG. 2) with a random number created from a key supplied from key information DB 22, and associates each value (1,0) of the scrambled 96-bit embedding data's bit with each of 6144 pairs 64 times by the following method to write to the embedding data allocation column of the embedding table as shown in FIG. 15.

Moreover, as illustrated in FIG. 15, each bit of 96-bit embedding data scrambled in different orders is associated with every consecutive 96 pairs, which means for instance, the $7^{th}$ bit (1) of the embedding data is allocated to the $5^{th}$ pair and $160^{th}$ pair.

Hereafter, each bit of 96-bit embedding data is likewise associated with each of 96 pairs included in each set in different order for each pair acquired by sequentially dividing 6144 pairs into 64 sets×96 pairs.

For instance, the $1^{st}$ to $4^{th}$ bits of 96-bit embedding data are associated with the $11^{th}, 5^{th}, 31^{st}$ and $9^{th}$ pairs in the $1^{st}$ set containing the $1^{st}$ to $96^{th}$ pairs respectively, whereas they are associated with the $99^{th}, 126^{th}, 100^{th}$ and $153^{rd}$ pairs in the $2^{nd}$ set containing the $97^{th}$ to $192^{nd}$ pairs respectively (illustrated in FIG. 22 later).

Also, as shown in FIG. 10, embedding part 30 uses a random number generated as mentioned above to determine which DCT coefficients ($A_1, A_2, B_1, B_2, C_1, C_2$) are taken out from the two DCT blocks (blocks 1 and 2) for each pair, and writes the values of DCT coefficients so taken out in the block 1 and 2 columns of the embedding table.

As mentioned above, which DCT coefficients of 8×8 composition embedding part 30 takes out is not fixed for each pair.

If the above process is complete, embedding part 30 manipulates the values of DCT coefficients ($A_1, A_2, B_1, B_2$, $C_1, C_2$) written in the block 1 and 2 columns of the embedding table so that the DCT coefficients ($A_1, A_2, B_1$, $B_2, C_1, C_2$) selected from DCT blocks (block 1 and 2) of each pair will represent the bit values in the embedding data allocation column of the embedding table based on the rules 1-1 and 1-2 indicated in the above Table 1.

As explained so far, embedding part 30 encodes in Huffman code again the DCT coefficients (DCT blocks) of luminance component Y in which embedding data is embedded and the DCT coefficients of chrominance components Cr, Cb so as to output them to image DB 24 (FIG. 2) as JPEG-method extensible compressed image data (JPEG data).

The components of embedding part 30 are explained by referring to FIGS. 3 and 4 again.

Decoding part 300 decodes in Huffman code the JPEG data supplied via camera IF 104 or memory card IF 106 according to control of control part 26, and outputs to encoding part 304 the DCT coefficients (DCT blocks) of the two types of chrominance components Cr, Cb and outputs to data embedding part 32 the DCT coefficients of luminance component Y, out of the three types of the DCT coefficients (DCT blocks) resulting from the decoding.

Data embedding part 32 performs the embedding process of embedding data explained by referring to FIG. 9 to FIG. 15.

Hereafter, each component of data embedding part 32 is explained by referring to FIG. 4 again.

Image dividing part 320 divides into the pairs shown in FIGS. 9(B) and (C) the DCT coefficients os intensity signal Y (DCT block; FIG. 9(A)) input from decoding part 300, and outputs them to coefficient manipulation part 328.

Random number generation part 322 generates a random number by a 16-bit linear congruence method by using a 64-bit key, for instance, input from key information DB 22 (FIG. 2), and outputs generated random number RN to positioning part 324 and scramble part 326.

Positioning part 324 determines, in each of the pairs created by image dividing part 320, which DCT coefficients of the two DCT blocks (blocks 1 and 2) is selected (positions of DCT coefficients to be selected; FIG. 10) by using random number RN input from random number generation part 322, and outputs position data indicating the determined DCT coefficients' positions to coefficient manipulation part 328. Scramble part 326 scrambles 96-bit embedding data input from embedding data generation part 20 (FIG. 20) by using random number RN input from random number generation part 322.

This scramble process of scramble part 326 outputs to coefficient manipulation part 328 the data (scrambled embedding data, merely referred to as embedding data hereafter) that has 96 bits as a repetition unit and contains all the bits of 96-bit embedding data in different order for each repetition unit, containing 64 units of this repetition.

Coefficient manipulation part 328 first creates and embedding table shown in FIG. 15.

Namely, coefficient manipulation part 328 first takes out, based on position data input from positioning part 324, DCT coefficients from the two DCT blocks (blocks 1 and 2; FIG. 9(B), etc.) of each pair (FIG. 10), writes them to blocks 1 and 2 columns of the embedding table (FIG. 15), and further writes embedding data input from scramble part 326 to the embedding data allocation column of the embedding table.

Figure 16:
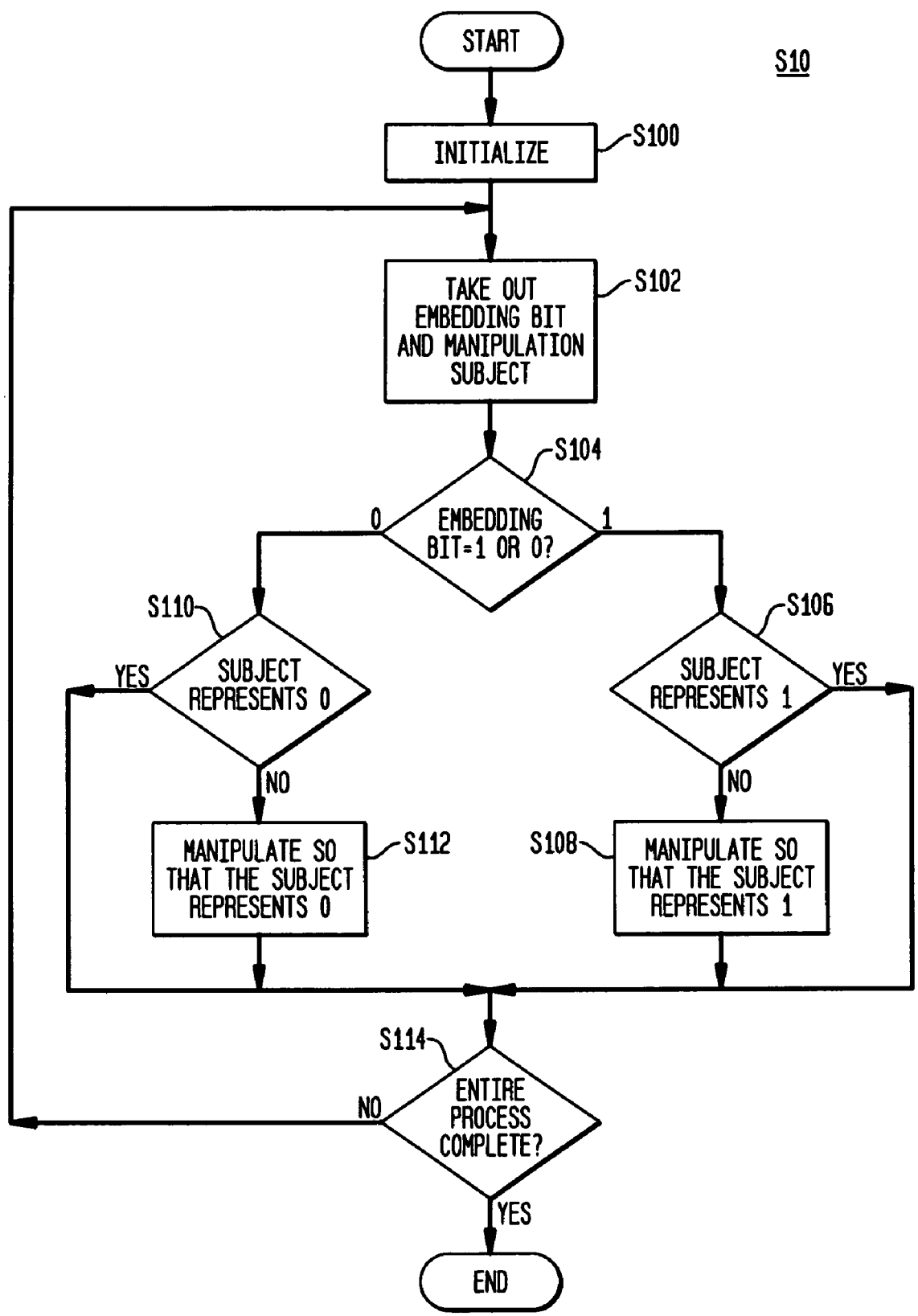
FIG. 16 is a diagram showing the process (S10) of the coefficient manipulation part shown in FIG. 4 to embed embedding data in a pair of DCT blocks.

FIG. 16 is a diagram showing the process (S10) for coefficient manipulation part 328 shown in FIG. 4 to embed embedding data in a pair of DCT blocks.

Next, coefficient manipulation part 328 embeds in each of the pairs of DCT coefficients (DCT blocks) the embedding data's bit associated therewith in the embedding table (FIG. 15), and outputs the embedding data to encoding part 304 (FIG. 3) as DCT coefficient Y' of the luminance component that was embedded.

As shown in FIG. 16, coefficient manipulation part 328 initializes variable i that shows 6144 pairs in step 100 (S100) at 1.

In step 102 (S102), coefficient manipulation part 328 takes out the DCT coefficients ($A_1, A_2, B_1, B_2, C_1, C_2$) of the ith pair to be manipulated from blocks 1 and 2 columns of the embedding table (FIG. 15) and the bit to the embedded likewise from the embedding data allocation column of the embedding table.

In step 104 (S104), coefficient manipulation part 328 determines whether or not the value of the embedding bit taken out in S102 process is 1, and proceeds to S106 process if it is 1, or proceeds to S110 process if it is 0.

In step 106 (S106), coefficient manipulation part 328 determines whether or not the subject DCT coefficients meet rule 1-1 indicated in Table 1, namely, whether or not the subject DCT coefficients represent 1, and proceeds to S114 process if they meet rule 1-1, or proceeds to S108 otherwise as illustrated in FIG. 12.

In step 108 (S108), coefficient manipulation part 328 manipulates so that the subject DCT coefficients meet rule 1-1.

Moreover, in S108 process, if the subject DCT coefficients exceed a normal range of values, coefficient manipulation part 328 performs an exceptional treatment according to the use of image alteration detection apparatus 1 (FIG. 1) such as not performing embedding process of bit (1) (manipulation of DCT coefficients) or terminating the process by displaying an error message.

In step 110 (S110), coefficient manipulation part 328 determines whether or not the subject DCT coefficients meet rule 1-2 indicated in Table 1, namely, whether or not the subject DCT coefficients represent O, and proceeds to S114 process if they meet rule 1-2, or proceeds to S112 otherwise.

In step 112 (S112), coefficient manipulation part 328 manipulates so that the subject DCT coefficients meet rule 1-2.

Moreover, as a result of S112 process, if the subject DCT coefficients exceed a normal range of values, coefficient manipulation part 328 performs an exceptional treatment just as it did in S108 process.

In step 114 (S114), coefficient manipulation part 328 determines whether or not variable i is 6144, namely, whether or not the process of embedding the embedding data in all the pairs is complete, and terminates the process if it is complete, or returns to S102 process by increasing variable i by 1 otherwise.

Encoding part 304 (FIG. 3) performs a process reverse to those shown in FIG. 7 and FIG. 8, and encodes in Huffman code the DCT coefficients of chrominance components CR, Cb input from decoding part 300 and the DCT coefficient Y' of luminance component Y input from data embedding part 32 and in which embedding data is embedded so as to output them to image DB 24.

Figure 17:
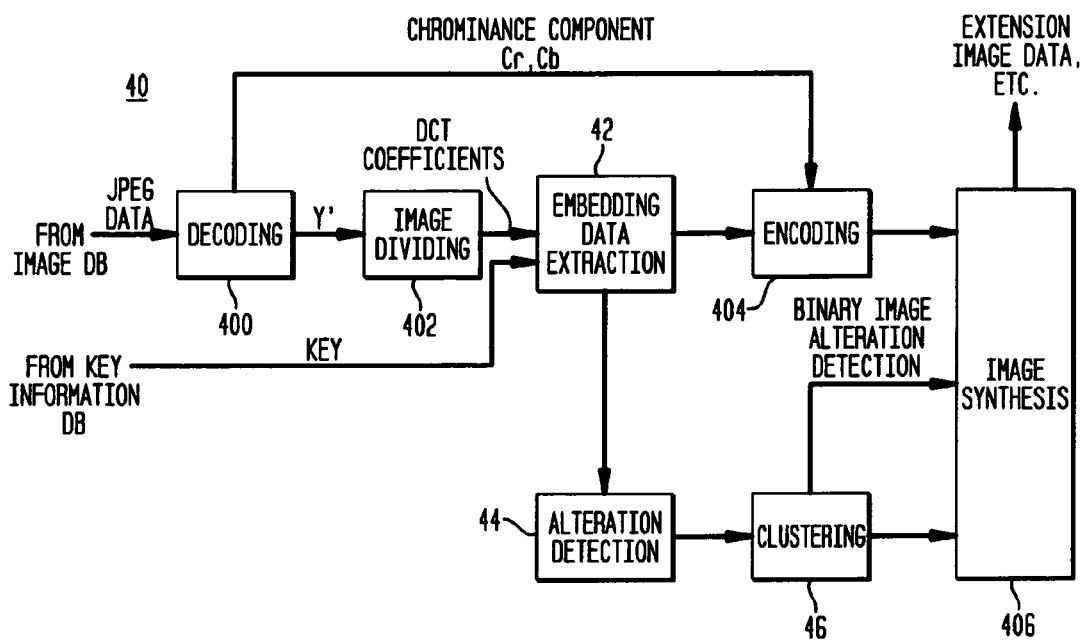
FIG. 17 is a diagram showing the structure of the extraction part illustrated in FIG. 2.

FIG. 17 is a diagram showing the structure of extraction part 40 illustrated in FIG. 2.

Figure 18:
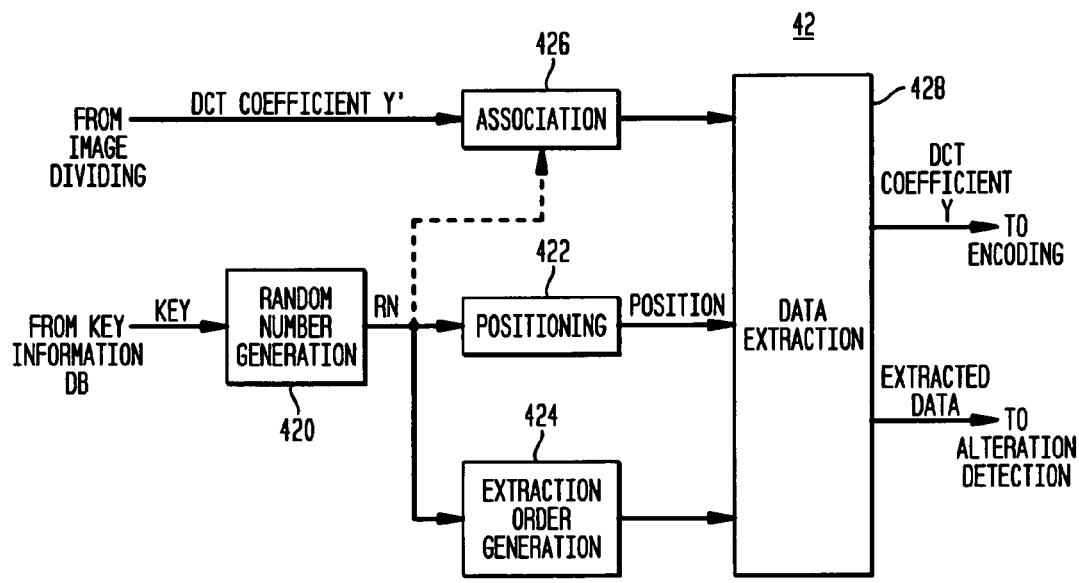
FIG. 18 is a diagram showing the structure of the embedding data extraction part illustrated in FIG. 13.

FIG. 18 is a diagram showing the structure of embedding data extraction part 42 illustrated in FIG. 13.

As shown in FIG. 17 and FIG. 18, extraction part 40 is comprised of decoding part 400, image dividing part 402, encoding part 404, image synthesis part 406, embedding data extraction part 42, alteration detection part 44 and clustering part 46, while embedding data extraction part 42 is comprised of random number generation part 420, positioning part 422, extraction order generation part 424, association part 426 and data extraction part 428.

If alteration is subsequently added by embedding part 30 to a part or all of JPEG data in which embedding data is embedded as mentioned above by referring to FIG. 9 to FIG. 16, the relationship among the values of the DCT coefficients ($A_1, A_2, B_1, B_2, C_1, C_2$; FIG. 10, etc.) Mutually corresponding and used to embed embedding data between the two DCT blocks (blocks 1 and 2; FIG. 9(B), etc.) of each pair does not show the value of the bit embedded by the process illustrated in FIG. 11(A), (B) to FIG. 14 according to rules 1-1 and 1-2 indicated in the above Table 1.

Extraction part 40 detects and indicates, by the above-mentioned components and exploiting such nature of JPEG data in which embedding data is embedded, whether or not alteration was added to the JPEG data generated by embedding part 30, and if alteration was added, to which part of image data (FIG. 5) it was added.

Hereafter, processing of extraction part 40 is described in detail by further referring to FIG. 19 to FIG. 26.

As mentioned above, in embedding part 30 (FIGS. 2 and 3), the positions of DCT coefficients used to embed embedding data in each pair can be acquired likewise by a random number generated from a key supplied from key information DB 22.

Accordingly, also in extraction part 40, it is possible to know, by using the same key as embedding part 30, which DCT coefficients are used to embed embedding data in DCT blocks (blocks 1 and 2; FIG. 10) of each pair.

Also, in embedding part 30, each bit of 96-bit embedding data is scrambled by a random number generated from a key supplied from key information DB 22 and associated with each pair.

Accordingly, also in extraction part 40, it is possible to know, by using the same key as embedding part 30, which bit of 96-bit embedding data is associated with which pair.

Thus, extraction part 40 knows which DCT coefficients are used to embed the bits in the two DCT blocks (blocks 1 and 2) of each pair by using the same key as embedding part 30, and further extracts the value (1,0) of the embedding data's bit embedded in each pair depending on whether the relationship among the values of the mutually corresponding DCT coefficients used to embed the bits falls under rule 1-1 or 1-2 indicated in the above Table 1.

Next, by using the same key as embedding part 30, extraction part 40 detects, which bit of the embedding data is corresponding to the value of the embedding data's bit extracted from each pair.

Figure 19A:
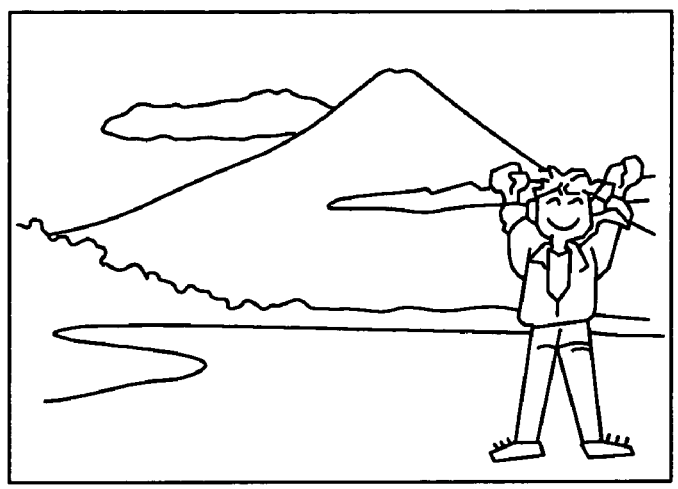
FIG. 19(A) is a drawing illustrating an image wherein JPEG data in which embedding data was embedded by the embedding part (FIG. 2, 3) is extended, and (B) is a drawing illustrating alteration added to the image shown in (A), and (C) is a drawing illustrating the image after alteration.

FIG. 19(A) is a drawing illustrating an image wherein JPEG data is which embedding data was embedded by embedding part 30 (FIGS. 2, 3) is extended, and (B) is a drawing illustrating alteration added to the image shown in (A), and (C) is a drawing illustrating the image after alteration.

Figure 19B:
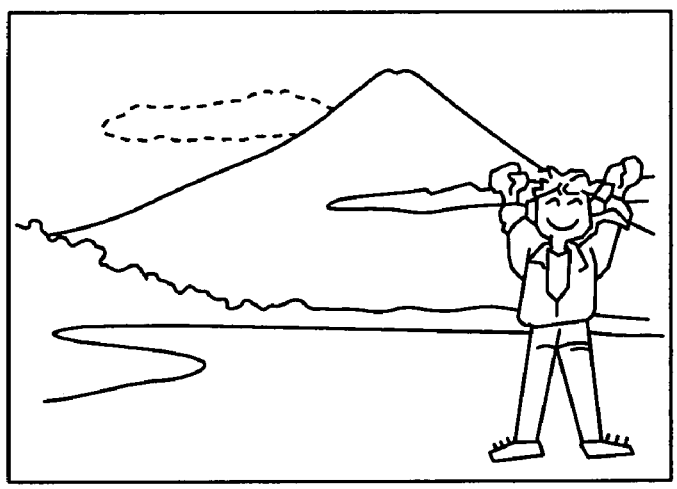

Here, if embedding part 30 adds alteration to the JPEG data acquired from the image data shown in FIG. 5 and FIG. 6(A) to (C) so that the JPEG data generated by embedding the embedding data as shown in FIG. 9 to FIG. 16 is extended by someone, and the image illustrated in FIG. 19(A) is acquired and alteration is added thereto as shown in a dotted line in FIG. 19(B) and compressed and encoded again by the JPEG method to replace the original JPEG data, because the alteration was only added to a minor part of them, many of the 64 values extracted from the 64 pairs associated with the identical bit of the embedding data should show the values before the alteration and only minority of them should show the values changed by the alteration.

Extraction part 40 exploits such nature of an image when alteration was added to a part of it and associates the bit extracted from each pair with each bit of the embedding data so as to make decision by majority, and if value 1 (0) is extracted from majority of the 64 pairs corresponding to the kth bit of the embedding data and value 0 (1) is extracted from a minority of pairs, it estimates that embedding part 30 embedded value 1 (0) in these 64 pairs as the kth bit.

Namely, while extraction part 40 makes decision by majority as to the extracted value for each bit of the embedding data and estimates the value that embedding part 30 embedded in each pair, and as a result of decision by majority, it determines that alteration was added to the pairs from which minority values were extracted.

Figure 20:
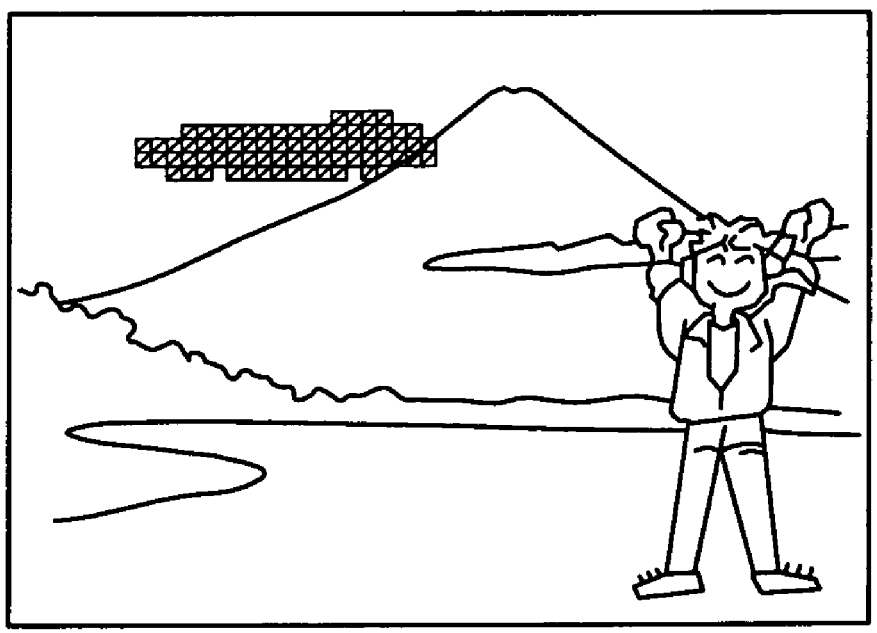
FIG. 20 is a drawing illustrating an image that shows a binary image indicating the part of alteration synthesized with the original image.

FIG. 20 is a drawing illustrating an image that shows a binary image indicating the part of alteration synthesized with the original image.

Furthermore, extraction part 40 synthesizes, for instance, a binary image showing a pair to which alteration was added (the mosaic part at the upper left of FIG. 20) as shown in FIG. 20 and the original image shown in FIG. 5 so as to indicate to which part alteration was added on display 100 (FIG. 1) and so on.

Figure 21:
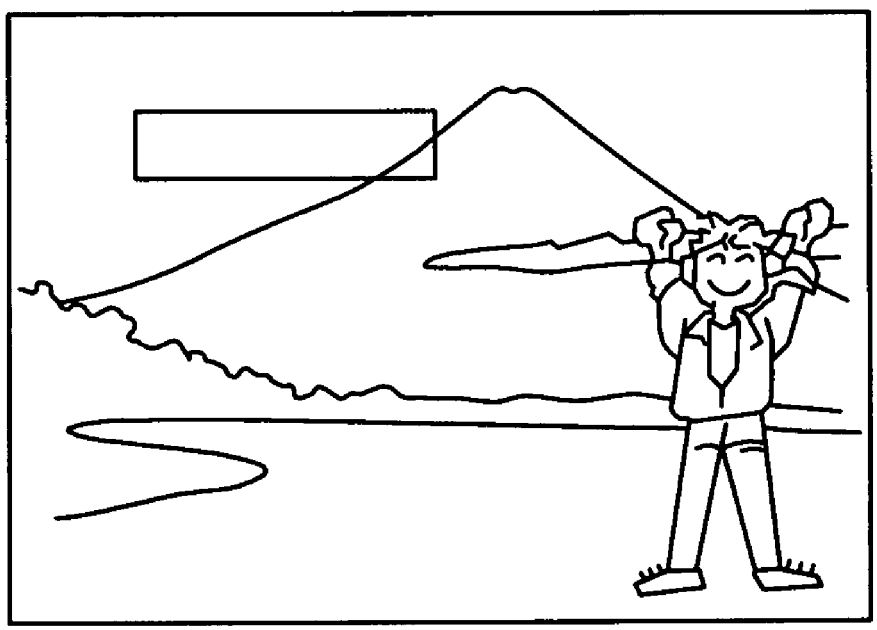
FIG. 21 is a drawing illustrating an image that shows the range in which alteration was added, synthesized with the original image by clustering process.

FIG. 21 is a drawing illustrating an image that shows the range in which alteration was added, synthesized with the original image by clustering process.

Or else, as shown in FIG. 21 for instance, extraction part 40 acquires by clustering process an image showing the range in which the mosaic part of a binary image shown in FIG. 20 exists (the rectangle at the upper left of FIG. 21), and synthesizes this image and the original image shown in FIG. 5 so as to indicate in what range alteration was added on display 100 and so on.

To perform such process, extraction part 40 first decodes in Huffman code the JPEG data supplied from image DB 22 and takes out 12288 DCT coefficients of luminance component Y (DCT block Y') out of the acquired three types of DCT coefficients (DCT blocks) and then renders neighboring DCTs into 6144 pairs as shown in FIGS. 9(B) and (C).

Extraction part 40 determines which of rules 1-1 or 1-2 the relationship among the DCT coefficients used to embed embedding data in the two DCT blocks (blocks 1 and 2; FIG. 10) contained in each of these pairs falls under, and extracts the value (1, 0) of the embedding data (second embedding data)'s bit embedded in each pair. If corresponding DCT coefficients of the two DCT blocks (DCT blocks 1 and 2) are equal ($A_1 = A_2$ for instance), the relationship falls under neither 1-1 nor 1-2, so extraction part 40 can immediately determine that alteration was added to this pair.

FIG. 22 is a diagram showing, in the case that no alteration/error was added to JPEG data generated by embedding part 30 (FIGS. 2 and 3), the value of the bit that extraction part 40 extracts from each pair contained in JPEG data with no alteration, etc. added.

If extraction part 40 arranges the value of embedding data's bit extracted from each pair (second image block) contained in JPEG data with neither alteration nor an error added after being generated by embedding part 30 according to which bit of the embedding data is associated with each pair as shown in FIG. 22, the values of all the bits extracted from the pairs corresponding to each embedding data match.

Figures 23, 24:
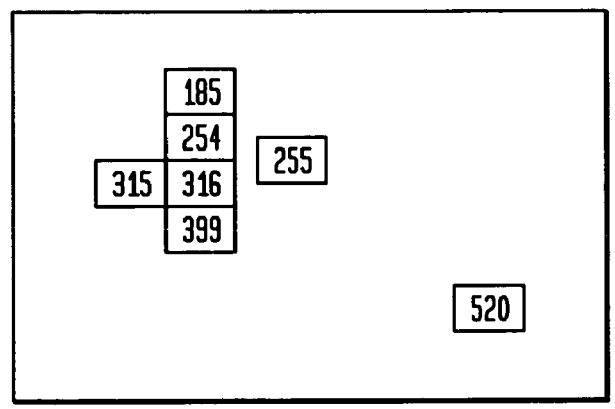
FIG. 23 is a diagram illustrating, in the case that alteration/error was added to JPEG data generated by the embedding part (FIGS. 2 and 3), the values of the bits extracted by the extraction part from the pairs included in the JPEG data with alteration, etc. added.
FIG. 24 is a diagram illustrating, when the extraction part (FIGS. 17 and 18) detects the pairs with alteration, etc. added as shown in FIG. 23 from the JPEG data with alteration added as shown in FIG. 19, a binary image showing the positions of the pairs with alteration added in the image.

FIG. 23 is a diagram illustrating, in the case that alteration/error was added to JPEG data generated by embedding part 30 (FIGS. 2 and 3), the values of the bits extracted by extraction part 40 from the pairs included in the JPEG data with alteration, etc. added.

Moreover, it FIG. 23, symbol A indicates that the relationship among the DCT coefficients of the pair observes rule 1-1 indicated in Table 1, symbol B indicates that the relationship among the DCT coefficients of the pair observes rule 1-2, and symbol C indicates that the relationship among the DCT coefficients of the pair observes neither rule 1-1 nor 1-2.

On the other hand, if extraction part 40 arranges the value of embedding data's bit extracted from each pair (second image block) contained in JPEG data with alteration, etc. added after being generated by embedding part 30 according to which bit of the embedding data is associated with each pair as if FIG. 22, as shown in FIG. 23, the values of the bits extracted from the minority pairs with alteration added take different values from those extracted from other majority pairs with no alteration added as indicated as the values in thick frames in FIG. 23, and there arises a mismatch.

It is explained more concretely.

In the case illustrated in FIG. 23, the relationship among the DCT coefficients of the majority of 63 pairs 11, 99, . . . corresponding to the bit 1 of the embedding data observes rule 1-1, and only one (minority) pair 399 observes rule 1-2.

Accordingly, the value of this bit 1 can be determined as 1 from the relationship among the DCT coefficients of the majority pairs.

Moreover, of the 64 pairs corresponding to the bit 2 of the embedding data, one pair 400 observes neither rule 1-1 nor 1-2 such as values among the three coefficients being partly equal, it can be immediately determined that alteration was added to this pair 400.

Of the remaining 63 pairs excluding pair 400, the relationship among the DCT coefficients of the majority of 62 pairs 5, 126, . . . observe rule 1-2, and only one (minority) pair 315 observes rule 1-1.

Accordingly, the value of this bit 2 can be determined as 0 from the relationship among the DCT coefficients of the majority pairs of the remaining 63 pairs excluding pair 400 that observes neither rule 1-1 nor 1-2.

Likewise, hereafter, extraction part 40 extracts the values of the bits embedded in the remaining (64-q) pairs excluding q pairs that observe neither rule 1-1 nor 1-2 and can immediately be determined as alteration added, and makes decision by majority as to these so as to estimate the value as that of the embedding data's bit embedded by embedding part 30.

FIG. 24 is a diagram illustrating, when extraction part 40 (FIGS. 17 and 18) detects the pairs with alteration, etc. added as shown in FIG. 23 from the JPEG data with alteration added as shown in FIG. 19, a binary image showing the positions of the pairs with alteration added in the image. Moreover, for explanation purposes, the example shown in FIG. 24 does not necessarily match the one shown in FIG. 19.

Thus, extraction part 40 generates, as shown in FIG. 24, a binary image that shows where in the screen a pair from which a different value from that estimated by decision by majority was extracted is located.

Moreover, a binary image generated by extraction part 40 is synthesized with the original image by referring to FIG. 20 as mentioned above to be displayed on display 100 (FIG. 1) and so on.

FIG. 25(A) to (D) are diagrams illustrating, when extraction part 40 (FIGS. 17 and 18) detects the pairs with alteration, etc. added as shown in FIG. 23 from the JPEG data with alteration added as shown in FIG. 19, a clustering image illustrating in what range in the image the pairs with alteration added exist. Moreover, for explanation purposes, the examples shown in FIG. 25(A) to (D) do not necessarily match the ones shown in FIG. 20, etc.

Figure 25A:
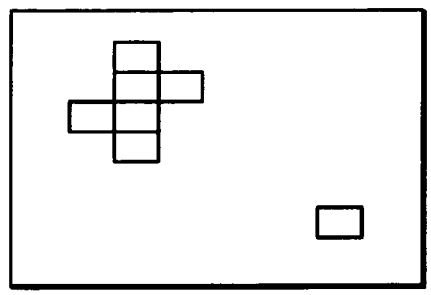
FIG. 25(A) to (D) are diagrams illustrating, when the extraction part (FIGS. 17 and 18) detects the pairs with alteration, etc. added as shown in FIG. 23 from the JPEG data with alteration added as shown in FIG. 19, a clustering image illustrating in what range in the image the pairs with alteration added exist.
Figure 25B:
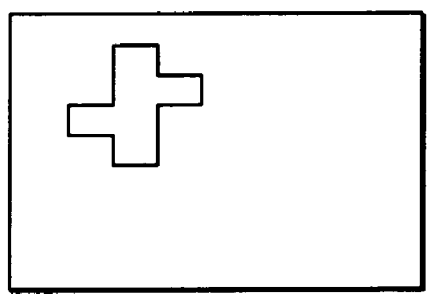
Figure 25C:
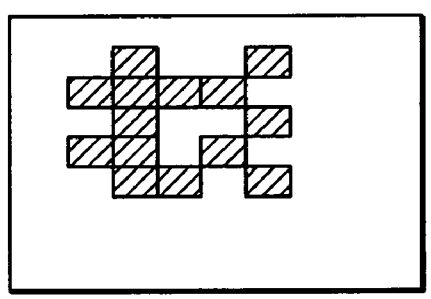
Figure 25D:
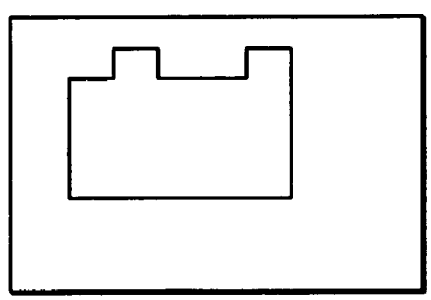

Also, extraction part 40 detects, as illustrated in FIGS. 25(A) and (C) respectively, in what range in the screen a pair from which a different value from that estimated by decision by majority was extracted exists and generates clustering images as illustrated in FIGS. 25(B) and (D) respectively.

Moreover, a clustering image generated by extracting part 40 is synthesized with the original image by referring to FIG. 21 as mentioned above to be displayed on display 100 (FIG. 1) and so on.

The components of extraction part 40 are explained by referring to FIGS. 17 and 18 again.

Decoding part 400 decodes in Huffman code the JPEG data supplied from image DB 22 according to control of control part 26 in response to operation, and outputs to encoding part 404 chrominance components Cr, Cb and outputs to image dividing part 402 luminance component Y', out of the three types of image components resulting from the decoding.

Image dividing part 402 divides by DCT coefficient (DCT block) luminance component Y' input from decoding part 400, and outputs the resulting DCT coefficients (DCT blocks) to embedding data extraction part 42.

Embedding data extraction part 42 associates each of two DCT blocks of luminance component Y' input from image dividing part 402 to generate pairs similar to the ones in embedding part 30 (FIG. 9(B), (C) and FIG. 10, etc.), and extracts the values of embedding data's bits embedded in these pairs, and then outputs them to alteration detection part 44 as extracted data in the forms illustrated in FIGS. 22 and 23.

Embedding data extraction part 42 also outputs to encoding part 404 luminance component Y' input fro image dividing part 402 as it is as luminance component Y.

Association part 426 (FIG. 18) associates, out of 12288 DCT coefficients (DCT blocks) input from image dividing part 402, two neighboring DCT blocks (blocks 1, 2; FIG. 9 (B), etc.) and generates 6144 pairs of DCT coefficients (FIGS. 9(B) and (C)), and then outputs them to data extraction part 428.

Namely, association part 426 is corresponding to image dividing part 320 (FIG. 4) of embedding part 30 (FIGS. 2 and 3) and generates pairs of DCT blocks just as image dividing part 320.

Random number generations part 420 generates a random number RN by the same method as in embedding part 30 by using the same key as the one used by embedding part 30 to embed embedding data, supplied from key information DB 22 (FIG. 2), and outputs generated random number RN to positioning part 422 and extraction order generation part 424.

Namely, random number generation part 420 generates the same random number as that of random number generation part 322 (FIG. 4) of embedding part 30 by the same method and from the same key as the one used by random number generation part 322 and corresponding thereto.

Positioning part 422 generates, from a random number RN input from random number generation part 420, position data showing which DCT coefficient of the two DCT blocks (blocks 1 and 2) included in each pair is used to embed embedding data in embedding part 30, and outputs it to data extraction part 428.

Namely, positioning part 422 generates the same position data as that of positioning part 324 of embedding part 30 from the random number that is the same as that used by and corresponding to positioning part 324. As mentioned above, as for 6144 pairs input in data extraction part 428 from association part 426, each bit of 96-bit embedding data is associated with each of the 96 pairs included in each set with 96 pairs as a set and in different order for each set.

Extraction order generation part 424 generates, from a random number RN input from random number generation part 420, order data indicating which pair is associated with which order bit of 96-bit embedding data and outputs it to data extraction part 428.

Data extraction part 428 determines, in the two DCT blocks (blocks 1 and 2) included in each pair input from association part 426, whether the relationship among the values of the mutually corresponding DCT coefficients (FIG. 10, etc.) indicated by position data input from positioning part 422 falls under rule 1-1 or 1-2 indicated in the above Table 1 and extracts the value of the embedding data's bit embedded in each pair.

In addition, data extraction part 428 sorts the extracted values of bits according to the order input from extraction order generation part 424 to generate extracted data in the forms illustrated in FIGS. 22 and 23, and outputs it to extraction order generation part 424.

Figure 26:
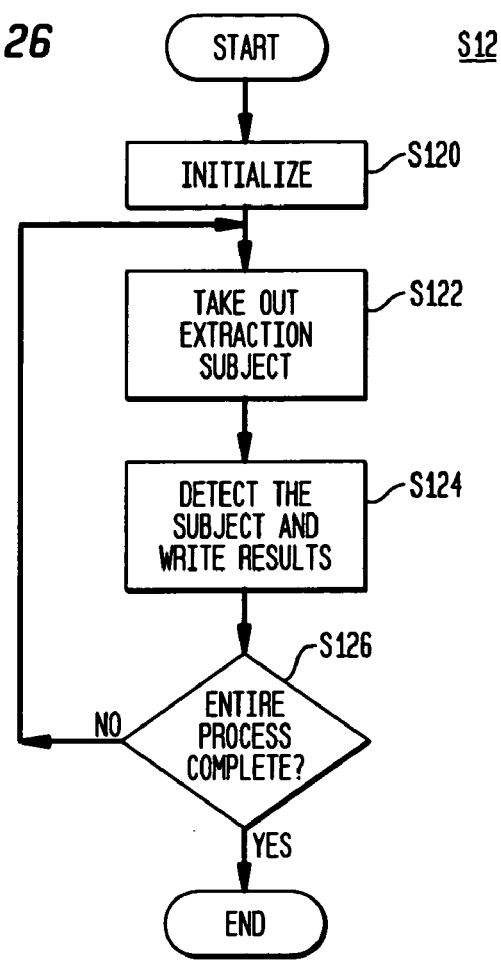
FIG. 26 is a flowchart showing processing of the data extraction part shown in FIG. 18 to extract embedding data's bits embedded in each pair.

The bit extraction process of data extraction part 428 is further explained by referring to FIG. 26.

FIG. 26 is a flowchart showing processing of data extraction part 428 shown in FIG. 18 to extract embedding data's bits embedded in each pair.

As shown in FIG. 26, in step 120 (S120), data extraction part 428 initializes variable i that shows 6144 pairs by assigning 1 to it.

In step 122 (S122), data extraction part 428 takes out the ith pair indicated by variable i as an extraction subject.

In step 124 (124), data extraction part 428 determines, in the two DCT blocks (blocks 1 and 2) included in an extraction subject pair that was taken out, whether the relationship among the DCT coefficients indicated by position data input from positioning part 422 falls under rule 1-1 or 1-2 indicated in the above Table 1, and extracts the bit of value 1 from the ith pair if it falls under rule 1-1, and extracts the bit of value 0 if it falls under rule 1-2.

In addition, data extraction part 428 determines, based on order data input from extraction order generation part 424, which bit of the embedding data the value of the extracted bit is corresponding to, and writes the value (1, 0) of the extracted bit to the position acquired as a result of determination in the extracted data (FIGS. 22 and 23).

In step 126 (S126), data extraction part 428 determines whether or not variable i is 6144, namely whether or not extraction of bits from all the pairs is complete, and terminates the process if it is complete, or proceeds to S122 process by increasing variable i by 1 otherwise.

If extraction of bits from all the pairs is complete, data extraction part 428 makes decision by majority as to 64 pairs extracted corresponding to each bit of the 96-bit embedding data, and estimates the embedding data embedded in embedding part 30 (FIGS. 2 and 3), and then outputs each pair as luminance component Y to encoding part 404.

Encoding part 404 (FIG. 17) encodes in Huffman code chrominance components Cr, Cb input from decoding part 400 and luminance component Y input from encoding part 404 to generate JPEG data, and outputs it to image synthesis part 406.

Alteration detection part 44 generates a binary image shown in FIG. 24 from extracted data (FIGS. 22 and 23) input from data extraction part 428 and outputs it to image synthesis part 406.

Clustering part 46 generates a clustering image (FIG. 25) showing a range in which it is shown that alteration and so on were added in a binary image input from alteration detection part 44 and outputs it to image synthesis part 406.

Figure 19C:
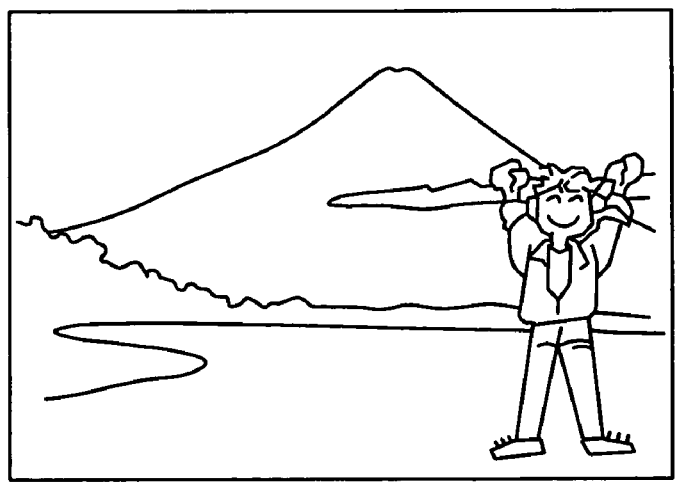

Image synthesis part 406 extends JPEG data input from encoding part 404, generates images illustrated in FIG. 5 or FIG. 19(C) and so on, and displays the generated images as it is on display 100 (FIG. 1) according to control of control part 26.

Or image synthesis part 406 synthesizes a binary image input from alteration detection part 44 or a clustering image input from clustering part 46 and an image resulting from extension, and generates the image illustrated in FIG. 20 or FIG. 21 and then displays the part in the image to which alteration was added on display 100.

Or image synthesis part 406 displays a binary image input from alteration detection part 44 or a clustering image input from clustering part 46 as it is on display 100 to show in what range in the image alteration and so on were added.

Figure 27:
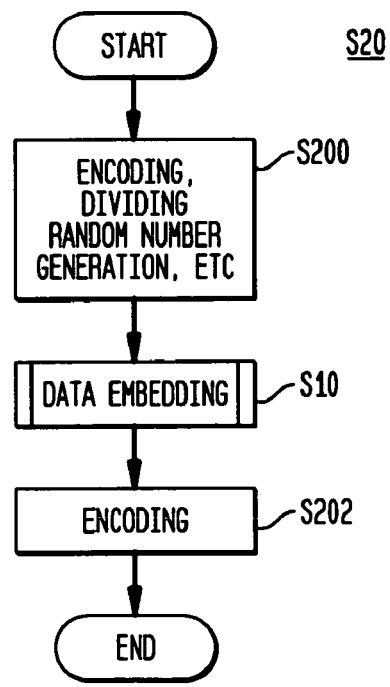
FIG. 27 is a flowchart showing the embedding process (S20) of embedding data by the image alteration detection apparatus shown in FIG. 1.

Hereafter, the embedding process of embedding data of image alteration detection apparatus 1 is explained in its entirety by referring to FIG. 27.

FIG. 27 is a flowchart showing the embedding process (S20) of embedding data by image alteration detection apparatus 1 shown in FIG. 1.

In step 200 (S200), decoding part 300 (FIG. 3) decodes in Huffman code JPEG data supplied via camera IF 104 and so on and outputs 12288 DCT coefficients (DCT blocks) of luminance component Y to data embedding part 32.

Image dividing part 320 divides the input DCT coefficients (DCT blocks; FIG. 9(A)) into 6144 pairs (FIG. 9(B), (C)) and outputs them to coefficient manipulation part 328.

Random number generation part 322 generates a random number by using a key input from key information DB 22 (FIG. 2), and outputs then generated random number RN to positioning part 324 and scramble part 326.

Positioning part 324 generates position data showing the positions of DCT coefficients used to embed embedding data by using random number RN input from random number generation part 322, and outputs it to coefficient manipulation part 328.

Scramble part 326 scrambles 96-bit embedding data input from embedding data generation part 20 (FIG. 2) by using random number RN input from random number generation part 322, and outputs it to coefficient manipulation part 328. In step 12 (S12), coefficient manipulation part 328 (FIG. 4) first selects in each pair the DCT coefficients ($A_1, A_2, B_1, B_2, C_1, C_2$; FIG. 10, etc.) in which embedding data is to be embedded based on position data input from positioning part 324.

In addition, coefficient manipulation part 328 associates each pair with each bit of embedding data input from scramble part 326, and creates an embedding table shown in FIG. 15.

Furthermore, coefficient manipulation part 328 sequentially takes out the DCT coefficients to be manipulated and the bits to be embedded, and embeds each bit of the embedding data in each pair according to rule 1-1, 1-2 indicated in the above Table 1 as illustrated in FIG. 11(A), (B) to FIG. 14.

If embedding of bits in all the pairs is complete, in step 202 (S202), encoding part 304 (FIG. 3) encodes in Huffman code the DCT coefficients (DCT blocks) of a luminance component in which embedding data is embedded and the DCT coefficients of other components input from decoding part 300 to generate JPEG data, and outputs it to image DB 22 (FIG. 2).

Image DB 22 stores/manages JPEG data input from embedding part 30.

Figure 28:
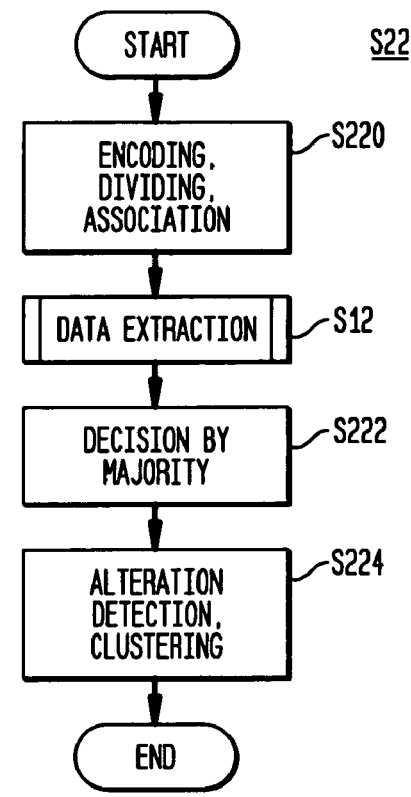
FIG. 28 is a flowchart showing the extracting process (S22) of embedding data by the image alteration detection apparatus shown in FIG. 1.

Hereafter, the extracting process of embedding data by image alteration detection apparatus 1 is explained in its entirety by referring to FIG. 28.

FIG. 28 is a flowchart showing the extracting process (S22) of embedding data by image alteration detection apparatus 1 shown in FIG. 1.

In step 220 (S220), decoding part 400 (FIG. 17) decodes in Huffman code JPEG data supplied from image DB 22 and outputs luminance component Y' to image dividing part 402.

Image dividing part 402 divides luminance component Y' into 12288 DCT coefficients (DCT blocks) and outputs them to embedding data extraction part 42.

In embedding data extraction part 42, association part 426 associates two each of neighboring DCT coefficients (DCT blocks; FIG. 9(A)) to generate 6144 pairs (FIG. 9 (B) and (C)), and outputs them to data extraction part 428.

Random number generation part 420 (FIG. 18) generates a random number by using a key input from key information DB 22 (FIG. 2), and outputs the generated random number RN to positioning part 422 and extraction order generation part 424.

Positioning part 422 generates, by using random number RN input from random number generation part 420, position data showing the positions of DCT coefficients used to embed embedding data, and outputs it to data extraction part 428.

Extraction order generation part 424 generates, by using a random number RN input from random number generation part 322, order data indicating which embedding data's bit is associated and outputs it to data extraction part 428.

In step 12 (S12), as shown in FIG. 26, data extraction part 428 sequentially takes out the pairs as extraction subjects and extracts the value of the bit embedded in each pair depending on whether the relationship among the DCT coefficients of the two DCT blocks (blocks 1 and 2) shown by the position data input from positioning part 422 fails under rule 1-1 or 1-2 indicated in the above Table 1.

In addition, data extraction part 428 determines, based on order data input from extraction order generation part 424, which bit of the embedding data the value of the extracted bit is corresponding to, and writes the value (1, 0) of the extracted bit to the position acquired as a result of determination in the extracted data (FIGS. 22 and 23).

In extraction of bits from all the pairs is complete, in step 222 (S222), data extraction part 428 makes decision by majority, in the extracted data illustrated in FIGS. 22 and 23, as to 64 pairs extracted corresponding to each bit of the 96-bit embedding data, and estimates the embedding data embedded in embedding part 30 (FIGS. 2 and 3).

Furthermore, encoding part 404 (FIG. 17) encodes in Huffman code chrominance components Cr, Cb input from decoding part 400 and luminance component Y input from encoding part 404 to generate JPEG data, and outputs it to image synthesis part 406.

In step 224 (S224), alteration detection part 44 generates a binary image shown in FIG. 24 from the extracted data (FIGS. 22 and 23) input form data extraction part 428 and outputs it to image synthesis part 406.

Clustering part 46 generates a clustering image (FIG. 25) showing the range in which it is shown that alteration and so on were added in a binary image input from alteration detection part 44 and outputs it to image synthesis part 406.

Image synthesis part 406 synthesizes for instance, according to control of control part 26 in response to operational input, a binary image input from alteration detection part 44 or a clustering image input from clustering part 46 and an image resulting from extension, and generates an image illustrated in FIG. 20 or 21, and then displays a part in the image to which alteration and so on were added on display 100.

Hereafter, examples of modification of the first embodiment form of the present invention are explained.

In the first embodiment from explained so far, the embodiments were the cases where the entire area of image data is divided into pairs and alteration detection is also performed to the entire area of image data, although division and alteration detection of image data may be performed to a partial area of image data and a divided area does not have to match an alteration detection area.

Also, in the first embodiment form, the cases where DCT process is performed for compressing and encoding image data were explained, although the alteration detection method involved in the present invention can also be applied with almost no change to the cases other than DCT process where space/frequency transformation is used for compressing and encoding image data, wherein space area data is transformed to frequency area data, such as wavelet transformation, Fourier transform and FFT (fast Fourier transform).

Also, in the first embodiment form, the cases where embedding data is embedded in DCT coefficients of luminance component Y, although the alteration detection method involved in the present invention can also be applied to the cases where embedding data is embedded in chrominance components Cr, Cb.

In addition, needless to say, the alteration detection method involved in the present invention can also be applied to image data of other forms including RGB image data, etc.

Also, in the first embodiment form, association of DCT blocks was performed by associating two neighboring DCT blocks, while it is also possible for instance, to randomly select two of 12288 DCT blocks by using a random number and associate them as a pair.

Moreover, as shown in a dotted line in FIG. 4, it is also possible to supply random number RN from random number generation part 322 to image dividing part 320 so that image dividing part 320 uses this random number RN and randomly selects two each of DCT coefficients (DCT blocks) to make a pair.

Also, as shown in a dotted line in FIG. 18, it is also possible to supply random number RN from random number generation part 420 to association part 426 so that association part 426 uses this random number RN and reproduces a pair associated by image dividing part 320.

Moreover, the method for scrambling embedding data is not limited to what was shown as the first embodiment form, and it can be any method by which each bit of 96-bit embedding data can be allocated to 6144 pairs 64 times each.

Also, appropriate transformation of embedding/detection program 2 involved in the present invention can be applied to a use for detecting which part of contents data of image data and other types such as voice data alteration was added to.

A case where the present invention is applied to voice data is further explained as an example.

As for voice data, successive sample points can be processed as one block. For instance, if every 1024 pieces of voice data of sampling frequency 44.1 kHz are one block, voice data of one second contains 44 voice data blocks.

If these voice data blocks are transformed by FFT or the like to data blocks of a frequency area, it is possible to embed embedding data by a method similar to the first embodiment form and to detect alteration by using the embedded data.

Figure 29:
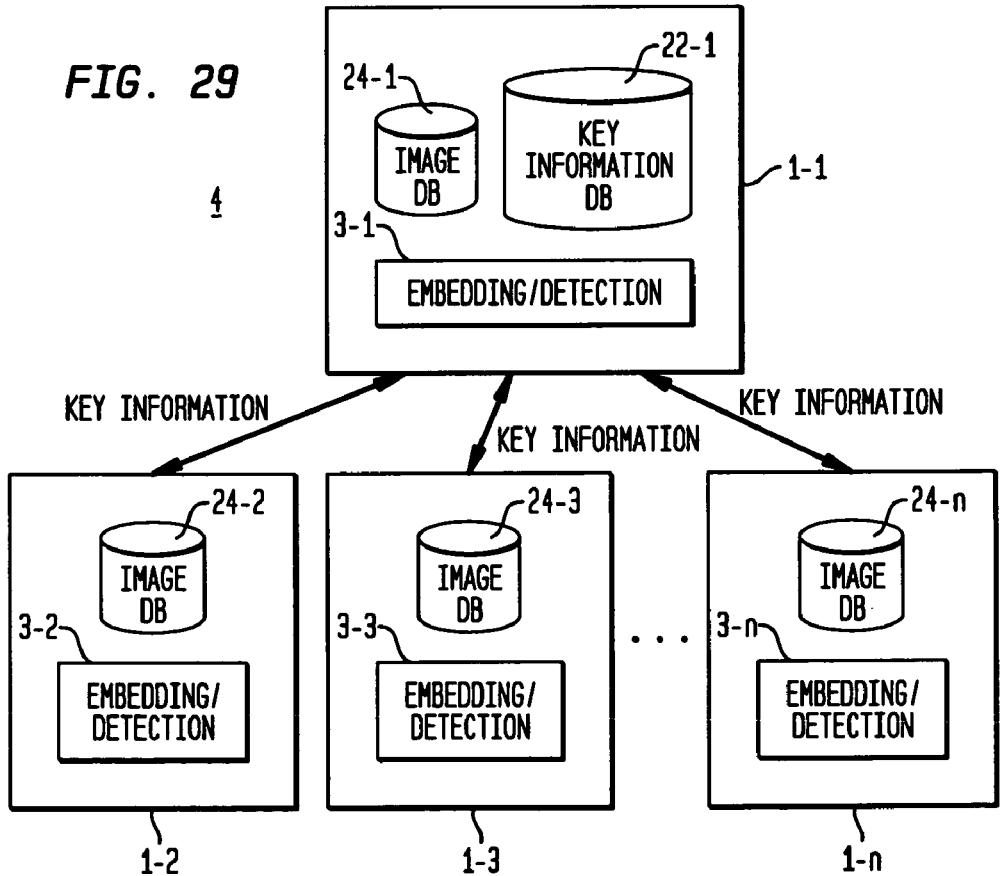
FIG. 29 is a diagram showing configuration of an alteration detection system connected with a plurality of image alteration detection apparatuses each comprising an image DB.

FIG. 29 is a diagram showing configuration of alteration detection system 4 connected with a plurality of image alteration detection apparatuses (1-1 to 1-n) each comprising image DB 24 (24-1 to 24-n).

Moreover, as shown in FIG. 29, in the case that a plurality of image alteration detection apparatuses 1-1 to 1-n each comprising one each of image DB 24 (24-1 to 24-n) and embedding/extraction part 3 (3-1 to 3-n) are connected via communication device 116 (FIG. 1; not illustrated in FIG. 29) to detect alteration added to image data by each image alteration detection apparatuses 1-1 to 1-n, the image data stored/managed in each image DB 24-1 to 24-n and its keys are centrally managed by key information DB 22-1 of image alteration detection apparatus 1-1 and the keys are delivered to each image alteration detection apparatuses 1-1 to 1-n, and thus high security can be ensured.

Hereafter, the second embodiment of the present invention is described by further referring to FIG. 30 to FIG. 39.

Figure 30:
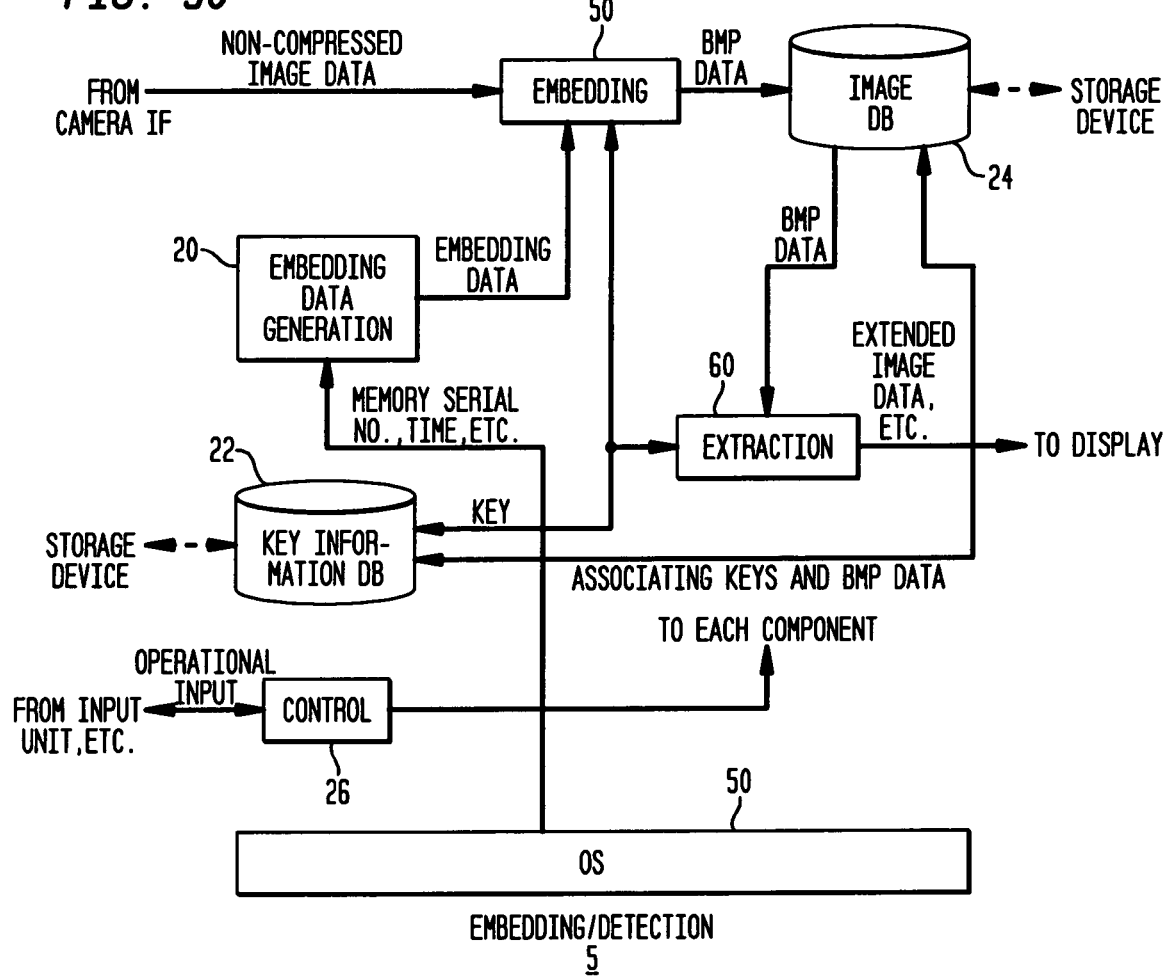
FIG. 30 is a diagram illustrating the structure of an embedding/detection program that the image alteration detection apparatus shown in FIG. 1 runs to implement the second alteration detection method involved in the present invention.

FIG. 30 is a diagram illustrating the structure of embedding/detection program 5 that image alteration detection apparatus 1 shown in FIG. 1 runs to implement the second alteration detection method involved in the present invention.

As shown in FIG. 30, embedding/detection program 5 has a structure wherein embedding part 30 of embedding/detection program 2 shown in FIG. 2 is replaced by embedding part 50, and extraction part 40 by extraction part 60, and performs a process similar to embedding/detection program 2 (FIG. 2) to non-compressed image data in an RGB bit map format.

Figure 31:
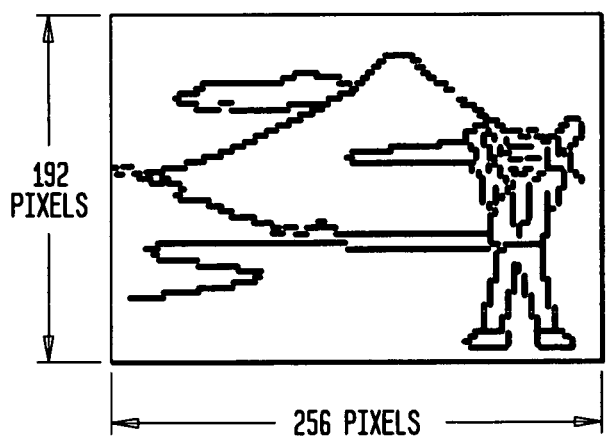
FIG. 31 is a drawing illustrating non-compressed image data that is a subject of processing by the embedding/detection program shown in FIG. 30.

FIG. 31 is a drawing illustrating non-compressed image data that is a subject of processing by embedding/detection program 5 shown in FIG. 30.

Figure 32:
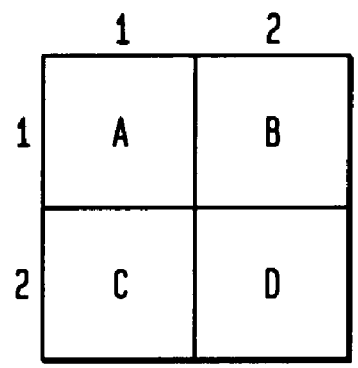
FIG. 32 is a diagram showing a pixel block comprised of 22 pixels that is a unit of processing by the embedding/detection program shown in FIG. 30.

FIG. 32 is a diagram showing a pixel block comprised of 2×2 pixels that is a unit of processing by embedding/detection program 5 shown in FIG. 30.

Figure 33:
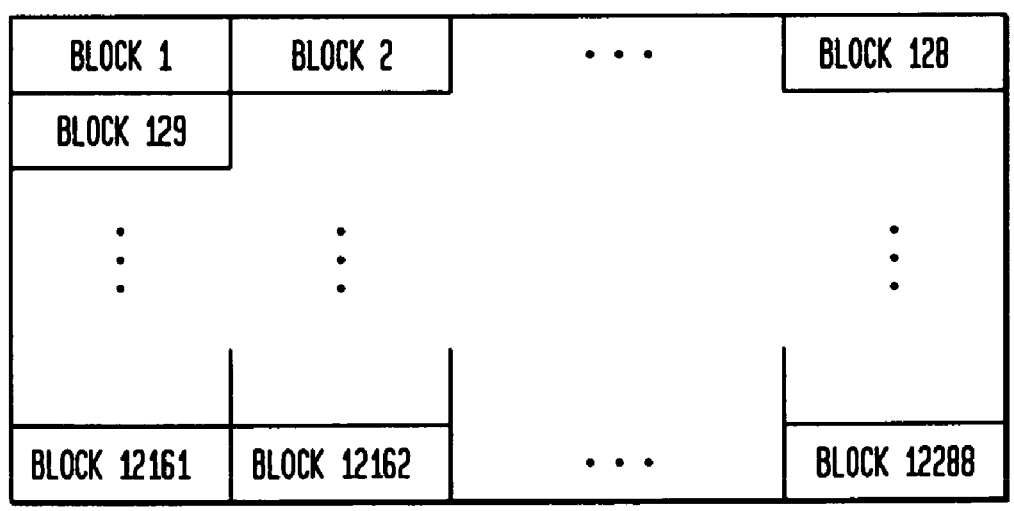
FIG. 33 is a diagram showing non-compressed image data (FIG. 31) that is divided into pixel blocks comprised of 22 pixels (FIG. 32).

FIG. 33 is a diagram showing non-compressed image data (FIG. 31) that is divided into pixel blocks comprised of 2×2 pixels (FIG. 32).

In embedding/detection program 5, embedding part 50 divides R component of non-compressed image data comprised of 192×256 pixels in an RGB bit map format illustrated in FIG. 31 into pixel blocks comprised of 2×2 (A, B, C and D) pixels shown in FIG. 32, and generates 12288 pixel blocks as shown in FIG. 33.

FIG. 34 is a diagram showing association of embedding data's bits with each of the pixel blocks shown in FIG. 33.

FIG. 35(A), (B) and FIG. 36 are diagrams showing a process of embedding part 50 shown in FIG. 30 to embed the bit of value 1 in the pixel block shown in FIG. 32, and FIGS. 35(A) and (B) show a case where a pixel value is manipulated to embed the bit of value 1, and FIG. 36 is a case where it is not manipulated to embed the bit of value 1.

As shown in FIG. 34, embedding part 50 (FIG. 30) associates each bit of scrambled 96-bit embedding data with each of the pixel blocks shown in FIG. 33, just like embedding/detection program 2 (FIG. 2).

As illustrated in FIG. 35(A), (B) and FIG. 36, if the bit value of the embedding data associated with the pixel block is 1, embedding part 50 manipulates the values of pixels A to D so that all the values of the four pixels (A to D) of the pixel block comprised of 2×2 pixels will become even numbers and besides, the difference of pixel values between before and after the change will be minimum.

FIG. 37(A), (B) and FIG. 38 are diagrams showing a process of embedding part 50 shown in FIG. 30 to embed the bit of value 0 in the pixel block shown in FIG. 32, and FIGS. 37(A) and (B) show a case where a pixel value is manipulated to embed the bit of value 1, and FIG. 38 is a case where it is not manipulated to embed the bit of value 1.

Or, as illustrated in FIG. 37(A), (B) and FIG. 38, if the bit value of the embedding data associated with the pixel block is 0, embedding part 50 manipulates the values of pixels A to D so that all the values of the four pixels (A to D) of the pixel block comprised of 2×2 pixels will become odd numbers and besides, the difference of pixel values between before and after the change will be minimum.

As explained above, non-compressed image data in which embedding data is embedded is stored/managed in image DB 24.

Hereafter, a process is explained by referring to FIG. 39, wherein extraction part 60 shown in FIG. 30 detects whether or not alteration was added to non-compressed image data in which embedding data was embedded by embedding part 50.

FIG. 39 is a diagram illustrating the process of extraction part 60 shown in FIG. 30.

Moreover, in FIG. 39, just as in FIG. 23, symbol A indicates that all the four pixel values of the pixel block are even numbers and the bit of value 1 is embedded, symbol B indicates that all the four pixel values of the pixel block are odd numbers and the bit of value 0 is embedded, and symbol C indicates that the four pixel values of the pixel block include even and odd numbers, and the thick frame indicates a pixel block where a mismatch has arisen.

Just as embedding part 50, extraction part 60 divides R component of non-compressed image data in which embedding data is embedded into pixel blocks comprised of 2×2 pixels (FIG. 32) as shown in FIG. 33.

Next, extraction part 60 determines whether the four pixel values of each pixel block represent bit value 1 or bit value 0, and as shown in FIG. 39, performs a process of making decision by majority (FIG. 23) just as extraction part 40 (FIG. 2) to extract embedding data so as to detect which pixel block alteration was added to.

In addition, just as extraction part 40 (FIG. 2), extraction part 60 adds a binary image (FIG. 20) or a clustering image (FIG. 21) to the part to which alteration was added, and shows it to a user.

As explained so far, the alteration detection method involved in the present invention can be applied, other than the application to compressed image data shown as the first embodiment form, to non-compressed image data and also image data other than that converted from a space area into a frequency area by DCT process and so on.

Also, as shown as the second embodiment form, the alteration detection method involved in the present invention can detect whether or not alteration was added by using an image block of different composition such as 2×2 pixel block composition, apart from 8×8 pixel block.

As explained so far, the alteration detection apparatus involved in the present invention and method thereof are not only capable of detecting whether or not alteration was added to contents data but also capable of further detecting which part of the contents data the alteration is added to.

While the invention has been particularly shown and described with respect to preferred embodiments thereof, it will be understood by those skilled in the art that the foregoing and other changes in form and details may be made therein without departing form the spirit and scope of the invention.

What is claimed is:

1. A contents alteration detection apparatus having a data filling apparatus and a detection apparatus, said data filling apparatus filling certain embedding data to contents data being objective to embed said embedding data, said detection apparatus detecting whether alteration was added to said contents data or not, said data filling apparatus, comprising:

a contents data dividing means for dividing at least a part of said contents data into a plurality of first data blocks, each first data block containing a plurality of unit data; and a data filling means for filling each of certain embedding data to each of said divided first data blocks to generate a plurality of second data blocks, the second data blocks having a modified relationship, relative to the first data blocks, between values of a corresponding plurality of said unit data in adjacent second data blocks according to a predefined rule, said detection apparatus, comprising:

a data extracting means for extracting said second embedding data filled in each of at least a part of said second data blocks to obtain second embedding data; and an alteration detecting means for detecting whether or not alteration was added to each of at least a part of said second data blocks based on said extracted second embedding data having the modified relationship according to the predefined rule, and an altered position indication means for analyzing the second embedding data relative to the first embedding data to determine for each of the second image blocks, whether changes were made in said each of the second image blocks for indicating the positions occupied by said second image blocks of which added alteration was detected.

2. A contents alteration detection apparatus having a data filling apparatus and a detection apparatus, said data filling apparatus filling certain embedding data to image data, said detection apparatus detecting whether alteration was added to said image data or not, said data filling apparatus, comprising: an image dividing means for dividing said image data into a plurality of first image blocks, each first image block containing a plurality of unit data; and a data filling means for filling each of certain first embedding data to each of said divided first image blocks to generate a plurality of second image blocks, the second image blocks having a modified relationship, relative to the first image blocks, between values of a corresponding plurality of said unit data in adjacent second image blocks according to a predefined rule, said detection apparatus, comprising: a data extracting means for extracting embedding data filled in each of said second image blocks to obtain second embedding data; and an alteration detecting means for detecting whether or not alteration was added to each of said second image blocks based on said extracted second embedding data having the modified relationship according to the predefined rule, and an altered position indication means for analyzing the second embedding data relative to the first embedding data to determine for each of the second image blocks, whether changes were made in said each of the second image blocks for indicating the positions occupied by said second image blocks of which added alteration was detected.

3. The contents alteration detection apparatus according to claim 2 wherein said first image blocks and said second image blocks are conversion blocks that contain said unit data, and also contain one or more sets of conversion coefficients acquired by dividing image data into certain processing blocks and converting it from a space domain into a frequency domain, respectively.

4. The contents alteration detection apparatus according to claim 2 wherein said first image blocks and said second image blocks are discrete cosine transformation (DCT) blocks that contain said unit data, and also contain plural sets of DCT coefficients acquired by dividing image data into certain DCT blocks and performing (DCT) process on it.

5. A contents alteration detection apparatus having a data filling apparatus and a detection apparatus, said data filling apparatus filling certain embedding data to image data, said detection apparatus detecting whether alteration was added to said image data or not, said data filling apparatus, comprising: an image dividing means for dividing said image data into a plurality of first image blocks, each first image block containing a plurality of unit data; and a data filling means for filling each of certain first embedding data to each of said divided first image blocks to generate a plurality of second image blocks, the second image blocks having a modified relationship, relative to the first image blocks, between values of a corresponding plurality of said unit data in adjacent second image blocks according to a predefined rule, said detection apparatus, comprising: a data extracting means for extracting said second embedding data filled in each of said second image blocks to obtain second embedding data; and an alteration detecting means for detecting whether or not alteration was added to each of said second image blocks based on said extracted second embedding data having the modified relationship according to the predefined rule, and an altered position indication means for indicating the positions occupied by said second image blocks of which added alteration was detected; and wherein said data filling means, in the case that alteration was added to any of said second image blocks, adjusts said mutually corresponding plurality of unit data values contained in said second image blocks to which alteration was added so that said values do not comply with said certain rule.

6. The contents alteration detection apparatus according to claim 5 wherein said data extracting means extracts as said second embedding data, from each of said plurality of second image blocks, the data represented by the relationship between or among said plurality of unit data values contained in each of said second image blocks according to a certain rule.

7. The contents alteration detection apparatus according to claim 6 wherein said alteration detecting means detects whether alteration was added to each of said second image blocks or not based on results of comparison between said embedded first embedding data and said extracted second embedding data.

8. A data filling apparatus filling certain embedding data to image data so as to detect whether alteration was added to image data, said detection being performed, based on second embedding data in each of a plurality of second image blocks contained in said image data, by detecting whether or not alteration was added to each of said second image blocks, and an altered position indication means for indicating the positions occupied by said second image blocks of which added alteration was detected, said data filling apparatus comprising: an image dividing means for dividing image data into a plurality of first image blocks, each first image block containing a plurality of unit data; and a data filling means for filling each of certain first embedding data to each of said divided first image blocks to generate a plurality of second image blocks, the second image blocks having a modified relationship, relative to the first image blocks, between values of a corresponding plurality of said unit data in adjacent second image blocks according to a predefined rule.

9. A data filling apparatus filling certain embedding data to image data so as to detect whether alteration was added to image data, said detection being performed, based on second embedding data in each of a plurality of second image blocks contained in said image data, by detecting whether or not alteration was added to each of said second image blocks, and an altered position indication means for indicating the positions occupied by said second image blocks of which added alteration was detected, said data filling apparatus comprising: an image dividing means for dividing image data into a plurality of first image blocks, each first image block containing a plurality of unit data; and a data filling means for filling each of certain first embedding data to each of said divided first image blocks to generate a plurality of second image blocks, the second image blocks having a modified relationship, relative to the first image blocks, between values of a corresponding plurality of said unit data in adjacent second image blocks according to a predefined rule; and wherein said data filling means, in the case that alteration was added to any said second image blocks, adjusts said mutually corresponding plurality of unit data values contained in each of said second image blocks to which alteration was added so that said values do not comply with said certain rule.

10. A detection apparatus for detecting whether or not alteration was added to each of a plurality of second image blocks having second embedding data generated by dividing image data into a plurality of first image blocks, each first image block containing a plurality of unit data, and filling each of certain first embedding data to each of said divided first image blocks, said detection apparatus comprising: a data extracting means for extracting second embedding data filled in each of said second image blocks, the second image blocks having a modified relationship, relative to the first image blocks, between values of a corresponding plurality of said unit data in adjacent second image blocks according to a predefined rule; and an alteration detecting means for analyzing the second embedding data relative to the first embedding data for detecting whether or not alteration was added to each of said second image blocks based on said extracted second embedding data having the modified relationship according to the predefined rule, and an altered position indication means for indicating the positions occupied by said second image blocks of which added alteration was detected.

11. A detection apparatus for detecting whether or not alteration was added to each of a plurality of second image blocks having second embedding data generated by dividing image data into a plurality of first image blocks, each first image block containing a plurality of unit data, and filling each of certain first embedding data to each of said divided first image blocks, said detection apparatus comprising: a data extracting means for extracting second embedding data filled in each of said second image blocks, the second image blocks having a modified relationship, relative to the first image blocks, between values of a corresponding plurality of said unit data in adjacent second image blocks according to a predefined rule; and an alteration detecting means for detecting whether or not alteration was added to each of said second image blocks based on said extracted second embedding data having the modified relationship according to the predefined rule, and an altered position indication means for indicating the positions occupied by said second image blocks of which added alteration was detected; and
wherein: in the case that alteration was added to any of said second image blocks, said mutually corresponding plurality of unit data values contained in each of said second image blocks to which alteration was added are adjusted so that said values do not comply with said certain rule; and said contents alteration detecting means detects whether or not alteration was added to each of said second image blocks based on results of comparison between said embedded first embedding data and said extracted second embedding data.

12. A contents alteration detection method for filling certain embedding data to contents data being objective to embed said embedding data, said detection method detecting whether alteration was added to said contents data or not while: dividing said contents data into a plurality of first data blocks, each first data block containing a plurality of unit data; filling each of certain first embedding data to each of said divided first data blocks to generate a plurality of second data blocks, the second data blocks having a modified relationship, relative to the first data blocks, between values of a corresponding plurality of said unit data in adjacent second data blocks according to a predefined rule, extracting said second embedding data filled in each of said second blocks to obtain second embedding data; and detecting whether or not alteration was added to each of said second data blocks based on said extracted second embedding data, relative to the first embedding data, and having the modified relationship according to the predefined rule, and detecting and indicating the positions occupied by said second image blocks of which added alteration was detected.

13. A recording medium in an alteration detection apparatus having a data filling apparatus and a detection apparatus, said data filling apparatus filling certain embedding data to image data, said detection apparatus detecting whether alteration was added to said image data or not, said recording medium carrying a program for having a computer execute the steps of: dividing image data into a plurality of first image blocks, each first image block containing a plurality of unit data; filling each of certain first image blocks to generate a plurality of second image blocks, the second image blocks having a modified relationship, relative to the first image blocks, between values of a corresponding plurality of said unit data in adjacent second image blocks according to a predefined rule extracting embedding data filled in each of said second image blocks to obtain second embedding data; and detecting whether or not alteration was added to each of said second image blocks based on said extracted second embedding data having the modified relationship according to the predefined rule, and detecting and indicating the positions occupied by said second image blocks of which added alteration was detected.

14. A recording medium in a data filling apparatus filling certain embedding data to image data so as to detect whether or not alteration was added to image data, said detection being performed, based on data filled to each of a plurality of second image blocks contained in said image data, by detecting whether or not alteration was added to each of said image blocks, and detecting and indicating the positions occupied by said second image blocks of which added alteration was detected, said recording medium carrying a program for having a computer execute the steps of: dividing image data into a plurality of first image blocks, each first image block containing a plurality of unit data; filling each of certain first embedding data to each of said divided first image blocks to generate a plurality of second image blocks, the second image blocks having a modified relationship, relative to the first image blocks, between values of a corresponding plurality of said unit data in adjacent second image blocks according to a predefined rule; extracting embedding data from the second image blocks to obtain second embedding data; and analyzing the second embedding data relative to the first embedding data to determine for each of the second image blocks, whether changes were made in said each of the second image blocks.

15. A recording medium in a detection apparatus for detecting whether or not alteration was added to each of a plurality of second image blocks generated by dividing image data into a plurality of first image blocks and filling each of certain first embedding data to each of said divided first image blocks, each first image block containing a plurality of unit data, and the second image blocks having a modified relationship, relative to the first image blocks, between values of a corresponding plurality of said unit data in adjacent second image blocks according to a predefined rule, said recording medium carrying a program for having a computer execute the steps of: extracting embedding data filled in each of said second image blocks to obtain second embedding data; detecting whether or not alteration was added to each of said second image blocks based on said extracted embedding data having the modified relationship according to the predefined rule; and, relative to the first embedding data, and detecting and indicating the positions occupied by said second image blocks of which added alteration was detected, based on said extracted second embedding data.

* * * * *

UNITED STATES PATENT AND TRADEMARK OFFICE
CERTIFICATE OF CORRECTION

| | |
|---|---|
| PATENT NO. | : 6,963,655 B1 |
| APPLICATION NO. | : 09/548377 |
| DATED | : November 8, 2005 |
| INVENTOR(S) | : Satoko Tonegawa et al. |

It is certified that error appears in the above-identified patent and that said Letters Patent is hereby corrected as shown below:

Column 5,
Line 27, "a value represented" should read -- a value represents --.

Column 10,
Line 54, "in Fig. 6(B). Moreover it is" should read -- in fig. 6(B). ¶ Moreover it is --.

Column 11,
Line 36, "DCT block hereafter. Also, each" should read -- DCT block hereafter. ¶ Also, each --.

Column 13,
Line 47, "the above rule 1-2. Accordingly" should read -- the above rule 1.2. ¶ Accordingly --.

Column 15,
Line 8, "part 328. Scramble part" should read -- part 328. ¶ Scramble part --.

Column 18,
Line 15, "embedded in each pair. If corresponding" should read -- embedded in each pair. ¶ If corresponding --.

Column 20,
Line 39, "positioning part 324. As mentioned above" should read -- positioning part 324. ¶ As mentioned above --.

UNITED STATES PATENT AND TRADEMARK OFFICE
CERTIFICATE OF CORRECTION

PATENT NO. : 6,963,655 B1
APPLICATION NO. : 09/548377
DATED : November 8, 2005
INVENTOR(S) : Satoko Tonegawa et al.

It is certified that error appears in the above-identified patent and that said Letters Patent is hereby corrected as shown below:

Column 22,
Line 19, "part 328. In step 12" should read -- part 328. ¶ In step 12 --.

Signed and Sealed this

Twenty-fifth Day of July, 2006

JON W. DUDAS
*Director of the United States Patent and Trademark Office*